United States Patent
Guo et al.

(10) Patent No.: US 12,375,267 B2
(45) Date of Patent: Jul. 29, 2025

(54) KEY MANAGEMENT METHOD AND COMMUNICATION APPARATUS

(71) Applicant: HUAWEI TECHNOLOGIES CO., LTD., Guangdong (CN)

(72) Inventors: Longhua Guo, Shanghai (CN); He Li, Shanghai (CN); Rong Wu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 190 days.

(21) Appl. No.: 18/163,980

(22) Filed: Feb. 3, 2023

(65) Prior Publication Data
US 2023/0179400 A1     Jun. 8, 2023

Related U.S. Application Data

(63) Continuation of application No. PCT/CN2020/107498, filed on Aug. 6, 2020.

(51) Int. Cl.
*H04L 9/08*     (2006.01)
*H04W 12/033*     (2021.01)
*H04W 4/06*     (2009.01)

(52) U.S. Cl.
CPC .......... *H04L 9/0819* (2013.01); *H04L 9/0861* (2013.01); *H04W 12/033* (2021.01); *H04W 4/06* (2013.01)

(58) Field of Classification Search
CPC ... H04L 9/0819; H04L 9/0861; H04L 9/3242; H04L 9/0833; H04L 63/205; H04L 2209/80; H04W 12/033; H04W 12/041; H04W 12/0433; H04W 4/06
See application file for complete search history.

(56) References Cited

U.S. PATENT DOCUMENTS 8,621,200 B2     12/2013     Lehtovirta et al.
9,420,456 B2     8/2016     Lehtovirta et al.
(Continued)

FOREIGN PATENT DOCUMENTS

CN     101582730 A     11/2009
CN     102761830 A     10/2012
(Continued)

OTHER PUBLICATIONS

Extended European Search Report issued in EP20948346.0, dated Aug. 4, 2023, 7 pages.
(Continued)

*Primary Examiner* — Han Yang

(57) ABSTRACT

Embodiments of the present disclosure provide a key management method and a communication apparatus, and relate to the field of communication technologies, to securely transmit multicast service data, and prevent an unauthorized terminal device from obtaining the multicast service data. The method includes: A terminal device obtains a target key, where the target key includes at least one of a target multimedia broadcast/multicast service service key (MSK), a first sub-key corresponding to the target MSK, or a second sub-key corresponding to the target MSK, the first sub-key is for confidentiality protection calculation, and the second sub-key is for integrity protection calculation. The terminal device receives target data, on which security protection is performed, from a multicast user-plane processing network element. Then, the terminal device processes the target data using the target key.

20 Claims, 12 Drawing Sheets

(56) References Cited

U.S. PATENT DOCUMENTS

| | | | | |
|---|---|---|---|---|
| 2008/0114978 | A1* | 5/2008 | Lehtovirta | H04W 12/0433 |
| | | | | 713/155 |
| 2011/0060900 | A1* | 3/2011 | Zhong | H04L 63/08 |
| | | | | 713/168 |
| 2012/0057697 | A1* | 3/2012 | Holtmanns | H04N 21/6543 |
| | | | | 380/42 |
| 2013/0294603 | A1* | 11/2013 | Lehtovirta | H04W 12/041 |
| | | | | 380/270 |

FOREIGN PATENT DOCUMENTS

| | | |
|---|---|---|
| CN | 104348627 A | 2/2015 |
| JP | 2015514380 A | 5/2015 |

OTHER PUBLICATIONS

3GPP TS 33.501 V16.3.0 (Jul. 2020), 3rd Generation Partnership Project; Technical Specification Group Services and System Aspects; Security architecture and procedures for 5G system(Release 16), 248 pages.

3GPP TS 23.502 V16.5.0 (Jul. 2020), 3rd Generation Partnership Project; Technical Specification Group Services and System Aspects;Procedures for the 5G System (5GS);Stage 2(Release 16), 594 pages.

3GPP TS 24.247 V16.0.0:3rd Generation Partnership Project; Technical Specification Group Core Network and Terminals; Messaging service using the IP Multimedia (IM) Core Network (CN) subsystem; Stage 3 (Release 16) Jul. 2020 total 78 pages.

3GPP TS 33.246 V16.0.0:"rd Generation Partnership Project; Technical Specification Group Services and System Aspects; 3G Security; Security of Multimedia Broadcast/Multicast Service (MBMS) (Release 16)," Jul. 2020, total 75 pages.

PCT International Search Report for Application No. PCT/CN2020/107498 dated Aug. 6, 2020, 10 pages.

Office Action issued in IN202317010156, dated May 21, 2024, 6 pages.

\* cited by examiner

KEY MANAGEMENT METHOD AND COMMUNICATION APPARATUS

CROSS-REFERENCE TO RELATED APPLICATIONS

This application is a continuation of International Application No. PCT/CN2020/107498, filed on Aug. 6, 2020, the disclosure of which is hereby incorporated by reference in its entirety.

TECHNICAL FIELD

The present disclosure relates to the field of communication technologies, and in particular, to a key management method and a communication apparatus.

BACKGROUND

To meet requirements of the real-time transport protocol (RTP) and the file delivery over unidirectional transport (FLUTE) protocol in a long term evolution (LTE) network, a multimedia broadcast/multicast service (MBMS) uses a three-layer key system to ensure secure data transmission. As shown in FIG. 1, one terminal device corresponds to one multimedia broadcast/multicast service user key (MUK). The MUK is for encrypting a multimedia broadcast/multicast service service key (MSK) to protect MSK distribution. The MSK is for encrypting a multimedia broadcast/multicast service transport key (MTK) to protect MTK distribution. The MTK is for encrypting service data to ensure secure service data transmission. The service data and the MTK are transmitted from a network device to a terminal device in a multicast session.

However, to further optimize a broadcast/multicast service, an architecture and a procedure of a 5th generation mobile communication (5th-generation, 5G) system are different from those of an LTE network. However, security protection on MBMS service data is not defined in the 5G system. Therefore, how to perform security protection on MBMS service data is a problem that urgently needs to be resolved.

SUMMARY

Embodiments of the present disclosure provide a key management method and a communication apparatus, to simplify a procedure of secure transmission of multicast service data, and prevent an unauthorized terminal device from obtaining the multicast service data.

To achieve the foregoing objectives, the following technical solutions are used in embodiments of the present disclosure.

According to a first aspect, an embodiment of the present disclosure provides a key management method. The method may be performed by a terminal device, or may be performed by a chip used in the terminal device. The following provides descriptions by using an example in which the method is performed by the terminal device. The method includes: The terminal device obtains a target key, where the target key includes at least one of a target multimedia broadcast/multicast service service key (MSK), a first sub-key corresponding to the target MSK, or a second sub-key corresponding to the target MSK, the first sub-key is for confidentiality protection calculation, and the second sub-key is for integrity protection calculation. The terminal device receives target data from a multicast user-plane processing network element, where the target data is data on which security protection is performed. Then, the terminal device processes the target data by using the target key. Herein, the multicast user-plane processing network element is one of the following network elements: a multicast/broadcast service user plane MBSU network element, a user plane function UPF network element, a user plane gateway UPGW, or a multicast service function MSF network element. The security protection includes at least one of data encryption and integrity verification.

In this way, after the terminal device receives the target data of the multicast user-plane processing network element, the terminal device processes the target data by using the target key. Herein, the target data is data obtained after security protection is performed on multicast service data. This ensures secure data transmission, and simplifies a processing procedure of the secure data transmission. Only the terminal device that obtains the target key can process the target data, and a terminal device that does not obtain the target key cannot process the target data, and therefore cannot obtain the data obtained after the target data is deprotected. This prevents an unauthorized terminal device from obtaining the multicast service data.

In a possible design, the key management method in this embodiment further includes: The terminal device receives a security algorithm from a first network element, where the security algorithm includes at least one of an encryption algorithm and an integrity protection algorithm. That the terminal device processes the target data by using the target key includes: The terminal device processes the target data by using the security algorithm and the target key. Herein, the first network element is the multicast user-plane processing network element or a key generation network element. The key generation network element is an SMF network element, an AMF network element, or an AUSF network element.

In this way, when the first network element is the multicast user-plane processing network element, the terminal device may obtain the security algorithm from a user plane message. Alternatively, when the first network element is the key generation network element, the terminal device receives the security algorithm from the key generation network element via an AMF network element. In other words, the terminal device may obtain the security algorithm from a control plane message. Then, the target data is processed by using the security algorithm.

In a possible design, the key management method in this embodiment further includes: The terminal device receives security protection status information from the first network element, where the security protection status information indicates a security protection status, and the security protection includes at least one of data encryption and integrity verification. For example, the security protection status information indicates that the security protection status is enabled or disabled. For example, the security protection status information indicates that the data encryption protection is in an enabled or disabled state, or the security protection status information indicates that the integrity verification is in an enabled or disabled state. That the terminal device processes the target data by using the target key includes: If the status indicated by the security protection status information is enabled, the terminal device processes the target data by using the target key.

Herein, the first network element is the multicast user-plane processing network element or a key generation network element. When the first network element is the multicast user-plane processing network element, the security protection status information is provided by the multicast user-plane processing network element. When the first network element is the key generation network element, the security protection status information is a target security policy determined by the key generation network element. The terminal device receives the target security policy from the key generation network element via an AMF network element. In this way, the terminal device can process the target data based on the obtained security protection status information.

In a possible design, that a terminal device obtains a target key includes: The terminal device receives the target key from the first network element. Herein, the first network element is the multicast user-plane processing network element or a key generation network element. In other words, the terminal device may obtain the target key from a control plane message or a user plane message.

In a possible design, the key management method in this embodiment further includes: The terminal device obtains an identifier of the target key. That a terminal device obtains a target key includes: The terminal device obtains the target key corresponding to the identifier of the target key.

In this way, the terminal device obtains the target key through indexing based on the identifier of the target key, to process the target data by using the "target key corresponding to the identifier of the target key". This simplifies a processing procedure on a terminal device side.

In a possible design, that the terminal device obtains an identifier of the target key includes: The terminal device receives the identifier of the target key from the first network element; or the terminal device receives a key number part from the first network element; and the terminal device determines the identifier of the target key based on the key number part and an identifier (ID) of a multicast service.

In other words, the terminal device can obtain the identifier of the target key in two manners. If an access network device provides the identifier of the target key for the terminal device, a processing procedure of "obtaining the identifier of the target key" on the terminal device side can be simplified. If the access network device provides the key number part for the terminal device, transmission resource overheads can be reduced in comparison with transmission of the "identifier of the target key".

In a possible design, the key management method in this embodiment further includes: The terminal device receives first information from a key generation network element, where the first information includes at least one of the following: an identifier of the multicast user-plane processing network element, a first parameter, or an ID of a multicast service. Herein, the first parameter is a parameter determined based on at least one of a first sequence number and a first timestamp. The terminal device generates a multimedia broadcast/multicast service user key (MUK) based on the first information and a shared key, where the shared key is a key shared between the terminal device and a core network device. That a terminal device obtains a target key includes: The terminal device receives key information from the multicast user-plane processing network element, where the key information is information obtained after the target key is encrypted by using the MUK; and the terminal device decrypts the key information by using the MUK, to obtain the target key.

In this way, when the key generation network element provides the first information for the terminal device, the terminal device can independently generate the MUK. When the multicast user-plane processing network element protects distribution of the target key by using the MUK, the terminal device can decrypt the key information by using the MUK, to obtain the target key.

In a possible design, the shared key is an authentication server function key Kausf, a security anchor function key Kseaf, or a key derived from Kausf.

In a possible design, the key management method in this embodiment further includes: The terminal device receives time information corresponding to the target key from the key generation network element. The time information corresponding to the target MSK indicates valid time of the target MSK. For example, the target key is the target MSK. Within valid time of the target MSK, the multicast user-plane processing network element protects distribution of second information (information for generating the target MTK) by using the target MSK. In this way, the terminal device can obtain the second information to generate the target MTK. On the contrary, the second information is not distributed beyond the valid time of the target MSK. In this case, the terminal device cannot obtain the second information, and therefore cannot generate the target MTK. Alternatively, within valid time of the target MSK, the multicast user-plane processing network element protects distribution of the multicast service data by using the target MSK. In this way, the terminal device can obtain the multicast service data. On the contrary, the target MSK does not exist beyond the valid time of the target MSK, and the multicast service data is no longer distributed. In this case, the terminal device cannot obtain the multicast service data.

In a possible design, that the terminal device processes the target data by using the target key includes: The terminal device decrypts ciphertext by using the target MSK or the first sub-key, to obtain a first plaintext, and the terminal device determines integrity of the first plaintext based on a MAC and at least one of the target MSK and the second sub-key, where the target data includes the first plaintext and the MAC. Alternatively, the terminal device decrypts ciphertext by using the target MSK or the first sub-key, where the target data includes the ciphertext. Alternatively, the terminal device determines integrity of a second plaintext based on a message authentication code MAC and at least one of the target MSK and the second sub-key, where the target data includes the MAC and the second plaintext. That is, the target MSK can be for both decryption and integrity verification processing. There are two types of processing performed by the terminal device on the target data, that is, decryption and integrity verification processing.

In a possible design, that the terminal device processes the target data by using the target key includes: The terminal device performs a derivation operation on the target MSK to obtain a derivation key; and then, the terminal device performs decryption or integrity verification on the target data by using the derivation key.

Herein, the derivation key is one of the following keys: the first sub-key, the second sub-key, a target multimedia broadcast/multicast service transport key MTK, a third sub-key, or a fourth sub-key. When the derivation key includes the first sub-key, the terminal device performs a first derivation operation on the target MSK to obtain the first sub-key. When the derivation key includes the second sub-key, the terminal device performs a second derivation operation on the target MSK to obtain the second sub-key. When the derivation key includes the target MTK, the terminal device performs a third derivation operation on the target MSK to obtain the target MTK, where the MTK is for decryption or integrity verification. When the derivation key includes the third sub-key, the terminal device performs a third derivation operation on the target MSK to obtain a target MTK, and then the terminal device performs a fourth derivation operation on the target MTK to obtain the third sub-key. The third sub-key is for confidentiality protection calculation. When the derivation key includes the fourth sub-key, the terminal device performs a third derivation operation on the target MSK to obtain a target MTK, and then the terminal device performs a fifth derivation operation on the target MTK to obtain the fourth sub-key. The fourth sub-key is for integrity protection calculation.

In this way, when security protection is performed on the target data by using the derivation key, the terminal device side can also perform derivation by using the target key, to obtain the derivation key, and then process the target data by using the derivation key. In addition, when the derivation key is implemented by the target MTK, the third sub-key, or the fourth sub-key, the terminal device can also perform derivation based on the target key, to obtain a key at an MTK level, to process the target data. Compared with a conventional technology in which "a terminal device directly receives an MTK from a network side", the terminal device obtains the key at the MTK level through derivation, to avoid a risk of key leakage in transmission.

In a possible design, that the terminal device performs a derivation operation on the target MSK to obtain a derivation key includes: The terminal device performs a derivation operation on the target MSK and second information to obtain the derivation key, where the second information includes at least one of the following: a protocol name, an identifier of the target MTK, or a second parameter. The second parameter is a parameter determined based on at least one of a second sequence number and a second timestamp. Herein, the second information may be information provided by the multicast user-plane processing network element for the terminal device.

In other words, when obtaining the target MSK and the second information, the terminal device may perform the derivation operation to obtain the second key, and the network side does not need to provide the target MTK for the terminal device, to reduce a risk of key leakage in transmission.

In a possible design, the second information is information encrypted by using the target MSK. The key management method provided in this embodiment further includes: The terminal device decrypts the second information by using the target MSK, to obtain decrypted information. That the terminal device performs a derivation operation on the target MSK and second information to obtain the derivation key includes: The terminal device performs a third derivation operation on the target MSK and the decrypted information to obtain the target MTK.

Herein, although the second information is distributed by using a multicast message, because the target MSK is transmitted by using a unicast message, the target MSK protects a distribution process of the second information, and the second information is for derivation of the target MTK. In this way, security of the target MTK derived based on the second information is equivalent to security of unicast message transmission.

In a possible design, the key management method in this embodiment further includes: The terminal device receives the encryption algorithm from the first network element. That the terminal device performs a first derivation operation on the target MSK to obtain the first sub-key includes: The terminal device performs the first derivation operation on the target MSK by using the encryption algorithm, to obtain the first sub-key. That the terminal device performs a fourth derivation operation on the target MTK to obtain the third sub-key includes: The terminal device performs the fourth derivation operation on the target MTK by using the encryption algorithm to obtain the third sub-key. Herein, the first network element is the multicast user-plane processing network element or a key generation network element.

In other words, the terminal device can obtain the encryption algorithm from a user plane message or a control plane message, and the encryption algorithm can be for deriving the first sub-key and the third sub-key.

In a possible design, the key management method in this embodiment further includes: The terminal device receives the integrity protection algorithm from the first network element. That the terminal device performs a second derivation operation on the target MSK to obtain the second sub-key includes: The terminal device performs the second derivation operation on the target MSK by using the integrity protection algorithm, to obtain the second sub-key. That the terminal device performs a fifth derivation operation on the target MTK to obtain the fourth sub-key includes: The terminal device performs the fifth derivation operation on the target MTK by using the integrity protection algorithm, to obtain the fourth sub-key. Herein, the first network element is the m"ltic'st user-plane processing network element or a key generation network element.

In other words, the terminal device can obtain the integrity protection algorithm from a user plane message or a control plane message, and the integrity protection algorithm can be for deriving the second sub-key and the fourth sub-key.

According to a second aspect, an embodiment of the present disclosure provides a key management method. The method may be performed by a multicast user-plane processing network element, or may be performed by a chip used in the multicast user-plane processing network element. The following provides descriptions by using an example in which the method is performed by the multicast user-plane processing network element. The method includes: The multicast user-plane processing network element obtains a target key, where the target key includes at least one of a target multimedia broadcast/multicast service service key (MSK), a first sub-key corresponding to the target MSK, or a second sub-key corresponding to the target MSK, the first sub-key is for confidentiality protection calculation, and the second sub-key is for integrity protection calculation. Then, the multicast user-plane processing network element performs security protection on multicast service data by using the target key, to obtain target data. The multicast user-plane processing network element sends the target data to a terminal device.

In a possible design, that the multicast user-plane processing network element obtains a target key includes: The multicast user-plane processing network element generates the target key; or the multicast user-plane processing network element receives the target key from a key generation network element.

In a possible design, the key management method in this embodiment further includes: The multicast user-plane processing network element sends the target key to the terminal device.

In a possible design, the key management method in this embodiment further includes: The multicast user-plane processing network element receives a multimedia broadcast/ multicast service user key (MUK) from the key generation network element. The multicast user-plane processing network element encrypts the target key by using the MUK, to obtain key information. Then, the multicast user-plane processing network element sends the key information to the terminal device.

In a possible design, the key management method in this embodiment further includes: The multicast user-plane processing network element receives time information corresponding to the MUK from the key generation network element. The time information corresponding to the MUK indicates valid time of the MUK.

In a possible design, the key management method in this embodiment of further includes: The multicast user-plane processing network element sends an identifier of the target MSK to the terminal device; or the multicast user-plane processing network element sends a key number part to the terminal device, where there is a mapping relationship between the key number part and an identifier of the target MSK.

In a possible design, the key management method in this embodiment further includes: The multicast user-plane processing network element receives time information corresponding to the target MSK from the key generation network element. The time information corresponding to the target MSK indicates valid time of the target MSK.

In a possible design, the key management method in this embodiment further includes: The multicast user-plane processing network element obtains a security algorithm. The security algorithm includes at least one of an encryption algorithm and an integrity protection algorithm. That the multicast user-plane processing network element performs security protection on multicast service data by using the target key, to obtain target data includes: The multicast user-plane processing network element performs security protection on the multicast service data by using the security algorithm and the target key, to obtain the target data.

In a possible design, the key management method in this embodiment further includes: The multicast user-plane processing network element determines security protection status information. The security protection status information indicates a security protection status, and the security protection includes at least one of data encryption and integrity verification. That the multicast user-plane processing network element performs security protection on multicast service data by using the target key, to obtain target data includes: If the status indicated by the security protection status information is enabled, the multicast user-plane processing network element performs security protection on the multicast service data by using the target key, to obtain the target data.

In a possible design, the key management method in this embodiment further includes: The multicast user-plane processing network element receives a target security policy from the key generation network element. The target security policy includes at least one of a confidentiality protection policy and an integrity protection policy. That the multicast user-plane processing network element determines security protection status information includes: The multicast user-plane processing network element determines the security protection status information based on the target security policy.

In a possible design, that the multicast user-plane processing network element performs security protection on multicast service data by using the target key, to obtain target data includes: The multicast user-plane processing network element encrypts the multicast service data by using the target MSK or the first sub-key, to obtain the ciphertext, where the target data includes the ciphertext; and/or the multicast user-plane processing network element determines a message authentication code MAC based on the multicast service data and at least one of the target MSK and the second sub-key, where the target data includes the MAC.

In a possible design, that the multicast user-plane processing network element performs security protection on multicast service data by using the target key, to obtain target data includes: The multicast user-plane processing network element performs a derivation operation on the target MSK to obtain a derivation key; and the multicast user-plane processing network element performs security protection on the multicast service data by using the derivation key, to obtain the target data.

Herein, the derivation key is one of the following keys: the first sub-key, the second sub-key, a target multimedia broadcast/multicast service transport key MTK, a third sub-key, or a fourth sub-key. When the derivation key includes the first sub-key, the multicast user-plane processing network element performs a first derivation operation on the target MSK to obtain the first sub-key. When the derivation key includes the second sub-key, the multicast user-plane processing network element performs a second derivation operation on the target MSK to obtain the second sub-key. When the derivation key includes the target MTK, the multicast user-plane processing network element performs a third derivation operation on the target MSK to obtain the target MTK, where the MTK is for decryption or integrity verification. When the derivation key includes the third sub-key, the multicast user-plane processing network element performs a third derivation operation on the target MSK to obtain a target MTK, and then the multicast user-plane processing network element performs a fourth derivation operation on the target MTK to obtain the third sub-key. The third sub-key is for confidentiality protection calculation. When the derivation key includes the fourth sub-key, the multicast user-plane processing network element performs a third derivation operation on the target MSK to obtain a target MTK, and then the multicast user-plane processing network element performs a fifth derivation operation on the target MTK to obtain the fourth sub-key. The fourth sub-key is for integrity protection calculation.

In a possible design, the key management method in this embodiment further includes: The multicast user-plane processing network element sends second information to the terminal device, where the second information includes at least one of the following: a protocol name, an identifier of the target MTK, or a second parameter. Herein, the second parameter is a parameter determined based on at least one of a second sequence number and a second timestamp. The second information is used by the terminal device to determine the target MTK.

In a possible design, the key management method in this embodiment further includes: The multicast user-plane processing network element encrypts the second information by using the target MSK. That the multicast user-plane processing network element sends second information to the terminal device includes: The multicast user-plane processing network element sends encrypted second information to the terminal device.

In a possible design, the key management method in this embodiment further includes: The multicast user-plane processing network element receives the encryption algorithm from the key generation network element. That the multicast user-plane processing network element performs a first derivation operation on the target MSK to obtain the first sub-key includes: The multicast user-plane processing network element performs the first derivation operation on the target MSK by using the encryption algorithm, to obtain the first sub-key. That the multicast user-plane processing network element performs a fourth derivation operation on the target MTK to obtain the third sub-key includes: The multicast user-plane processing network element performs the fourth derivation operation on the target MTK by using the encryption algorithm, to obtain the third sub-key.

In a possible design, the key management method in this embodiment further includes: The multicast user-plane processing network element receives the integrity protection algorithm from the key generation network element. That the multicast user-plane processing network element performs a second derivation operation on the target MSK to obtain the second sub-key includes: The multicast user-plane processing network element performs the second derivation operation on the target MSK by using the integrity protection algorithm, to obtain the second sub-key. That the multicast user-plane processing network element performs a fifth derivation operation on the target MTK to obtain the fourth sub-key includes: The multicast user-plane processing network element performs the fifth derivation operation on the target MTK by using the integrity protection algorithm, to obtain the fourth sub-key.

In a possible design, that the multicast user-plane processing network element performs a derivation operation on the target MSK to obtain a derivation key includes: The multicast user-plane processing network element performs a derivation operation on the target MSK and second information to obtain a derivation key, where the second information includes at least one of the following: a protocol name, an identifier of the target MTK, or a second parameter. Herein, the second parameter is a parameter determined based on at least one of a second sequence number and a second timestamp.

In a possible design, the key management method in this embodiment further includes: The multicast user-plane processing network element determines, based on at least one of a transport protocol type, a session type, a quality of service QoS parameter, or a network type, to generate the target MTK. The derivation key includes the target MTK.

In other words, the multicast user-plane processing network element can determine whether to generate the target MTK. The multicast user-plane processing network element derives the target MTK only when the target MTK is generated, and performs security protection on the multicast service data by using the target MTK. On the contrary, when the target MTK does not need to be generated, the multicast user-plane processing network element performs security protection on the multicast service data by using the target key.

In a possible design, the multicast user-plane processing network element includes one of the following network elements: a multicast/broadcast service user plane MBSU network element, a user plane function UPF network element, or a user plane gateway UPGW.

According to a third aspect, an embodiment of the present disclosure provides a key management method. The method may be performed by a key generation network element, or may be performed by a chip used in the key generation network element. Herein, the key generation network element may be an SMF network element, an AMF network element, or an AUSF network element. The following provides descriptions by using an example in which the method is performed by the key generation network element. The method includes: The key generation network element obtains a multimedia broadcast/multicast service user key (MUK); and then the key generation network element sends the MUK to a multicast user-plane processing network element.

In this way, in a 5G system, the key generation network element can obtain the MUK, and provide the MUK for the multicast user-plane processing network element, to prevent an operator from deploying a GBA system. This helps simplify a multicast service data processing procedure.

In a possible design, the key management method in this embodiment further includes: The key generation network element obtains first information. The first information includes at least one of the following: an identifier of the multicast user-plane processing network element, a first parameter, or an identifier (ID) of a multicast service. Herein, the first parameter is a parameter determined based on at least one of a first sequence number and a first timestamp. That a key generation network element obtains an MUK includes: The key generation network element generates the MUK based on the first information and a shared key. The shared key is a key shared between a terminal device and a core network device.

In other words, when the key generation network element obtains the first information, the key generation network element can independently generate the MUK. In this way, when an AUSF network element generates an MUK, an SMF can obtain the MUK from the AUSF network element.

It should be noted that when the key generation network element is implemented as an SMF network element, that an SMF network element obtains an MUK includes: The SMF network element sends the first information and a subscription permanent identifier SUPI of the terminal device to an AUSF network element, and the SMF network element receives an MUK from the AUSF network element. The MUK is generated based on the first information and the SUPI. Herein, both the first information and the SUPI that are sent by the SMF network element to the AUSF network element are carried in a key request message. The MUK received from the AUSF network element is carried in a key response message. In other words, when the SMF network element obtains the first information, the SMF network element can further provide the first information for the AUSF network element, so that the AUSF network element generates the MUK, and the SMF can obtain the MUK from the AUSF network element.

In a possible design, the key management method in this embodiment further includes: The key generation network element sends the first information to the terminal device, so that the terminal device generates the MUK.

In a possible design, the key management method in this embodiment further includes: The key generation network element sends time information corresponding to the MUK to the multicast user-plane processing network element. The time information corresponding to the MUK indicates valid time of the MUK.

In a possible design, the shared key is an authentication server function key Kausf, a security anchor function key Kseaf, or a key derived from Kausf.

According to a fourth aspect, an embodiment of the present disclosure provides a key management method. The method may be performed by a key generation network element, or may be performed by a chip used in the key generation network element. Herein, the key generation network element may be an SMF network element, an AMF network element, or an AUSF network element. The following provides descriptions by using an example in which the method is performed by the key generation network element. The method includes: The key generation network element obtains a target key, where the target key includes at least one of a target MSK, a first sub-key corresponding to the target MSK, or a second sub-key corresponding to the target MSK, the first sub-key is for confidentiality protection calculation, and the second sub-key is for integrity protection calculation. The key generation network element sends the target key to a multicast user-plane processing network element.

In other words, after the key generation network element obtains the target key, the key generation network element can further provide the target key for the multicast user-plane processing network element, so that the multicast user-plane processing network element performs security protection on multicast service data by using the target key.

In a possible design, the key management method in this embodiment further includes: The key generation network element sends an identifier of the target key to the multicast user-plane processing network element. Alternatively, the key generation network element sends a key number part to the multicast user-plane processing network element. There is a mapping relationship between the key number part and the identifier of the target key.

In other words, the key generation network element can provide the identifier of the target key for the multicast user-plane processing network element in two manners. If the key generation network element provides the identifier of the target key for the multicast user-plane processing network element, a processing procedure of "obtaining the identifier of the target key" on a multicast user-plane processing network element side can be simplified. If the key generation network element provides the key number part for the multicast user-plane processing network element, transmission resource overheads can be reduced in comparison with transmission of the "identifier of the target key".

In a possible design, the key management method in this embodiment further includes: The key generation network element sends time information corresponding to the target MSK to the multicast user-plane processing network element. The time information corresponding to the target MSK indicates valid time of the target MSK.

In a possible design, the key management method in this embodiment further includes: The key generation network element sends at least one of a key number part, the target key, and an identifier of the target key to the terminal device. There is a mapping relationship between the key number part and the identifier of the target key.

In a possible design, the key management method in this embodiment further includes: The key generation network element sends time information corresponding to the target MSK to the terminal device. The time information corresponding to the target MSK indicates valid time of the target MSK.

According to a fifth aspect, an embodiment of the present disclosure provides a key management method. The method may be performed by a key generation network element, or may be performed by a chip used in the key generation network element. Herein, the key generation network element may be an SMF network element, an AMF network element, or an AUSF network element. The following provides descriptions by using an example in which the method is performed by the key generation network element. The method includes: The key generation network element determines a target security policy. The target security policy includes at least one of a confidentiality protection policy and an integrity protection policy. The key generation network element sends the target security policy to a multicast user-plane processing network element.

In this way, in a 5G system, the key generation network element can determine the target security policy, so that the multicast user-plane processing network element and a terminal device determine whether a status of security protection between the multicast user-plane processing network element and the terminal device is enabled. The multicast user-plane processing network element performs security protection on multicast service data only when the security protection is in an enabled state.

In a possible design, the key management method in this embodiment further includes: that the key generation network element determines a target security policy includes: The key generation network element determines the target security policy based on a transmission status of a target multimedia broadcast multicast service transmission key MTK and a basic policy. The basic policy includes a multicast security policy in a multicast context or a user plane security policy in unified data management UDM subscription data. For example, when the target MTK is generated and transmitted, the key generation network element uses the basic policy as the target security policy, or the key generation network element modifies the basic policy, to obtain the target security policy.

In other words, when the key generation network element obtains the basic policy, the key generation network element can further determine the target security policy based on the transmission status of the target MTK.

In a possible design, the key management method in this embodiment further includes: The key generation network element determines a security algorithm. The security algorithm is for security protection calculation, and the security protection is indicated by the target security policy. The key generation network element sends the security algorithm to the multicast user-plane processing network element.

In a possible design, the key management method in this embodiment further includes: The key generation network element sends at least one of the target security policy and the security algorithm to the terminal device. The security algorithm is for security protection calculation, and the security protection is indicated by the target security policy.

According to a sixth aspect, an embodiment of the present disclosure provides a communication apparatus. The communication apparatus includes units configured to perform the steps according to any one of the foregoing aspects. The communication apparatus may be the terminal device according to any one of the first aspect or the possible designs of the first aspect, or a chip that implements a function of the terminal device. The communication apparatus includes a corresponding module, unit, or means for implementing the foregoing method. The module, unit, or means may be implemented by hardware, software, or hardware executing corresponding software. The hardware or the software includes one or more modules or units corresponding to the foregoing function.

According to a seventh aspect, an embodiment of the present disclosure provides a communication apparatus, including a processor and an interface circuit. The processor is configured to: communicate with another apparatus by using the interface circuit, and perform the key management method according to any one of the foregoing aspects. There are one or more processors. The communication apparatus may be the terminal device according to any one of the first aspect or the possible designs of the first aspect, or a chip that implements a function of the terminal device.

According to an eighth aspect, an embodiment of the present disclosure provides a communication apparatus, and the apparatus includes a processor and a memory. The memory is configured to store computer instructions; and when the processor executes the instructions, the communication apparatus performs the method according to any one of the foregoing aspects. The communication apparatus may be the terminal device according to any one of the first aspect or the possible designs of the first aspect, or a chip that implements a function of the terminal device.

According to a ninth aspect, an embodiment of the present disclosure provides a communication apparatus, and the apparatus includes a processor. The processor is coupled to a memory, and is configured to read instructions in the memory, and perform the method according to any one of the foregoing aspects according to the instructions. The communication apparatus may be the terminal device according to any one of the first aspect or the possible designs of the first aspect, or a chip that implements a function of the terminal device.

According to a tenth aspect, an embodiment of the present disclosure provides a communication apparatus. The communication apparatus includes units configured to perform the steps according to any one of the foregoing aspects. The communication apparatus may be the multicast user-plane processing network element according to any one of the second aspect or the possible designs of the second aspect, or a chip that implements a function of the multicast user-plane processing network element. The communication apparatus includes a corresponding module, unit, or means for implementing the foregoing method. The module, unit, or means may be implemented by hardware, software, or hardware executing corresponding software. The hardware or the software includes one or more modules or units corresponding to the foregoing function.

According to an eleventh aspect, an embodiment of the present disclosure provides a communication apparatus, including a processor and an interface circuit. The processor is configured to: communicate with another apparatus by using the interface circuit, and perform the key management method according to any one of the foregoing aspects. There are one or more processors. The communication apparatus may be the multicast user-plane processing network element according to any one of the second aspect or the possible designs of the second aspect, or a chip that implements a function of the multicast user-plane processing network element.

According to a twelfth aspect, an embodiment of the present disclosure provides a communication apparatus, including a processor and a memory. The memory is configured to store computer instructions; and when the processor executes the instructions, the communication apparatus performs the method according to any one of the foregoing aspects. The communication apparatus may be the multicast user-plane processing network element according to any one of the second aspect or the possible designs of the second aspect, or a chip that implements a function of the multicast user-plane processing network element.

According to a thirteenth aspect, an embodiment of the present disclosure provides a communication apparatus, including a processor. The processor is coupled to a memory, and is configured to read instructions in the memory, and perform the method according to any one of the foregoing aspects according to the instructions. The communication apparatus may be the multicast user-plane processing network element according to any one of the second aspect or the possible designs of the second aspect, or a chip that implements a function of the multicast user-plane processing network element.

According to a fourteenth aspect, an embodiment of the present disclosure provides a communication apparatus. The communication apparatus includes units configured to perform the steps according to any one of the foregoing aspects. The communication apparatus may be the key generation network element according to any one of the third aspect or the possible designs of the third aspect, or a chip that implements a function of the key generation network element; the communication apparatus may be the key generation network element according to any one of the fourth aspect or the possible designs of the fourth aspect, or a chip that implements a function of the key generation network element; or the communication apparatus may be the key generation network element according to any one of the fifth aspect or the possible designs of the fifth aspect, or a chip that implements a function of the key generation network element. The communication apparatus includes a corresponding module, unit, or means for implementing the foregoing method. The module, unit, or means may be implemented by hardware, software, or hardware executing corresponding software. The hardware or the software includes one or more modules or units corresponding to the foregoing function.

According to a fifteenth aspect, an embodiment of the present disclosure provides a communication apparatus, including a processor and an interface circuit. The processor is configured to: communicate with another apparatus by using the interface circuit, and perform the key management method according to any one of the foregoing aspects. There are one or more processors. The communication apparatus may be the key generation network element according to any one of the third aspect or the possible designs of the third aspect, or a chip that implements a function of the key generation network element; the communication apparatus may be the key generation network element according to any one of the fourth aspect or the possible designs of the fourth aspect, or a chip that implements a function of the key generation network element; or the communication apparatus may be the key generation network element according to any one of the fifth aspect or the possible designs of the fifth aspect, or a chip that implements a function of the key generation network element.

According to a sixteenth aspect, an embodiment of the present disclosure provides a communication apparatus, including a processor and a memory. The memory is configured to store computer instructions; and when the processor executes the instructions, the communication apparatus performs the method according to any one of the foregoing aspects. The communication apparatus may be the key generation network element according to any one of the third aspect or the possible designs of the third aspect, or a chip that implements a function of the key generation network element; the communication apparatus may be the key generation network element according to any one of the fourth aspect or the possible designs of the fourth aspect, or a chip that implements a function of the key generation network element; or the communication apparatus may be the key generation network element according to any one of the fifth aspect or the possible designs of the fifth aspect, or a chip that implements a function of the key generation network element.

According to a seventeenth aspect, an embodiment of the present disclosure provides a communication apparatus, including a processor. The processor is coupled to a memory, and is configured to read instructions in the memory, and perform the method according to any one of the foregoing aspects according to the instructions. The communication apparatus may be the key generation network element according to any one of the third aspect or the possible designs of the third aspect, or a chip that implements a function of the key generation network element; the communication apparatus may be the key generation network element according to any one of the fourth aspect or the possible designs of the fourth aspect, or a chip that implements a function of the key generation network element; or the communication apparatus may be the key generation network element according to any one of the fifth aspect or the possible designs of the fifth aspect, or a chip that implements a function of the key generation network element.

According to an eighteenth aspect, an embodiment of the present disclosure provides a computer-readable storage medium. The computer-readable storage medium stores instructions; and when the instructions are run on a computer, the computer is enabled to perform the key management method according to any one of the foregoing aspects.

According to a nineteenth aspect, an embodiment of the present disclosure provides a computer program product including instructions. When the computer program product runs on a computer, the computer is enabled to perform the key management method according to any one of the foregoing aspects.

According to a twentieth aspect, an embodiment of the present disclosure provides a circuit system, where the circuit system includes a processing circuit, and the processing circuit is configured to perform the key management method according to any one of the foregoing aspects.

According to a twenty-first aspect, an embodiment of the present disclosure provides a chip. The chip includes a processor, the processor is coupled to a memory, and the memory stores program instructions. When the program instructions stored in the memory are executed by the processor, the key management method according to any one of the foregoing aspects is implemented.

According to a twenty-second aspect, an embodiment of the present disclosure provides a communication system. The communication system includes a terminal device and a multicast user-plane processing network element. The terminal device is configured to obtain a target key. The target key includes at least one of a target MSK, a first sub-key corresponding to the target MSK, or a second sub-key corresponding to the target MSK. The first sub-key is for confidentiality protection calculation, and the second sub-key is for integrity protection calculation. The terminal device is further configured to receive target data from the multicast user-plane processing network element. The target data is data on which security protection is performed. The terminal device is further configured to process the target data by using the target key. The multicast user-plane processing network element is configured to obtain the target key. The target key includes at least one of a target MSK, a first sub-key corresponding to the target MSK, or a second sub-key corresponding to the target MSK, the first sub-key is for confidentiality protection calculation, and the second sub-key is for integrity protection calculation. The multicast user-plane processing network element is further configured to perform security protection on multicast service data by using the target key, to obtain the target data. The multicast user-plane processing network element is further configured to send the target data to the terminal device.

In a possible design, the communication system in this embodiment of the present disclosure further includes a key generation network element. The key generation network element is configured to obtain an MUK. The key generation network element is further configured to send the MUK to the multicast user-plane processing network element. Herein, the key generation network element may be an SMF network element, an AMF network element, or an AUSF network element.

In a possible design, the communication system in this embodiment further includes a key generation network element. The key generation network element is configured to obtain the target key. The key generation network element is further configured to send the target key to the multicast user-plane processing network element.

In a possible design, the communication system in this embodiment further includes a key generation network element. The key generation network element determines a target security policy. The target security policy includes at least one of a confidentiality protection policy and an integrity protection policy. The key generation network element sends the target security policy to the multicast user-plane processing network element. The multicast user-plane processing network element is further configured to determine security protection status information based on the target security policy. The security protection status information indicates a security protection status, and the security protection includes at least one of data encryption and integrity verification. The multicast user-plane processing network element is specifically configured to: if the status indicated by the security protection status information is enabled, perform security protection on the multicast service data by using the target key, to obtain the target data.

For technical effects brought by any design of the sixth aspect to the twenty-second aspect, refer to beneficial effects in the corresponding methods provided above. Details are not described herein again.

DESCRIPTION OF EMBODIMENTS

Figure 1:
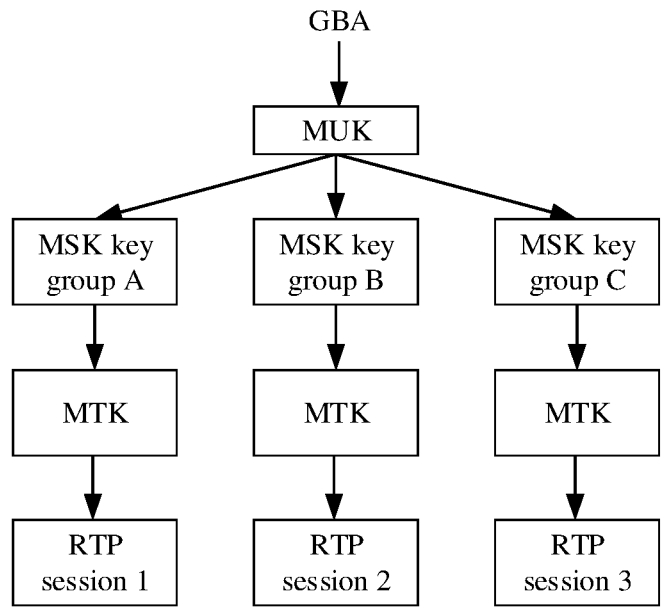
FIG. 1 is a schematic diagram of a key system of a three-layer architecture according to a related technology.

In the specification and accompanying drawings of the present disclosure, the terms "first", "second", and the like are intended to distinguish between different objects or distinguish between different processing of a same object, but do not indicate a particular order of the objects. In addition, the terms "including", "having", or any other variant thereof in descriptions of the present disclosure are intended to cover a non-exclusive inclusion. For example, a process, a method, a system, a product, or a device that includes a series of steps or units is not limited to the listed steps or units, but optionally further includes other unlisted steps or units, or optionally further includes another inherent step or unit of the process, the method, the product, or the device. It should be noted that, in embodiments of the present disclosure, the word "example" or "for example" is used to represent giving an example, an illustration, or a description. Any embodiment or design scheme described as an "example" or "for example" in embodiments of the present disclosure should not be explained as being more preferred or having more advantages than another embodiment or design scheme. Exactly, use of the word "example", "for example", or the like is intended to present a related concept in a specific manner.

Technical terms used in embodiments of the present disclosure are first described.

A multimedia broadcast/multicast service (MBMS) is a point-to-multipoint service in which a data source sends data to a plurality of terminal devices through a shared transmission link. This service is also referred to as a multicast broadcast service (MBS).

In a long term evolution (LTE) network, user plane security protection is performed between a terminal device and a broadcast/multicast service center (broadcast-multicast service centre, BM-SC). The BM-SC can provide a broadcast/multicast bearer service and an MBMS user service, and has functions such as session transmission, proxy forwarding, user management, and security. Herein, one MBMS user service includes one or more MBMS streaming sessions, and/or one MBMS user service includes one or more MBMS download sessions. One streaming session includes one or more RTP sessions. One download session includes one or more FLUTE channels. Each streaming session or each download session is carried in one or more MBMS transmission services. The MBMS user service and the MBMS transmission service are independent of each other, and there is a many-to-many relationship between MBMS user services and MBMS transmission services. The BM-SC uses a multimedia broadcast/multicast service service key (MSK) to protect different RTP sessions and FLUTE channels. Herein, the RTP session and the FLUTE channel are for transmitting a multimedia broadcast/multicast service transport key (MTK) and service data. The service data is encrypted by using the MTK. In this way, the MSK is for protecting distribution of the MTK, and the MTK is for protecting transmission of the service data.

Refer to FIG. 1. FIG. 1 shows a key system of the foregoing three-layer architecture. An MUK is a key at a terminal device granularity, and one terminal device corresponds to one MUK. MUKs in both a terminal device and a BM-SC are obtained by using a generic bootstrapping architecture (GBA). Different MSK key groups are for protecting different MTKs. As shown in FIG. 1, MSK key group A, MSK key group B, and MSK key group C are for protecting different MTKs. Different MTKs are for protecting different RTP sessions. As shown in FIG. 1, the MTK protected by MSK key group A is for protecting RTP session 1, the MTK protected by MSK key group B is for protecting RTP session 2, and the MTK protected by MSK key group C is for protecting RTP session 3.

Figure 2:
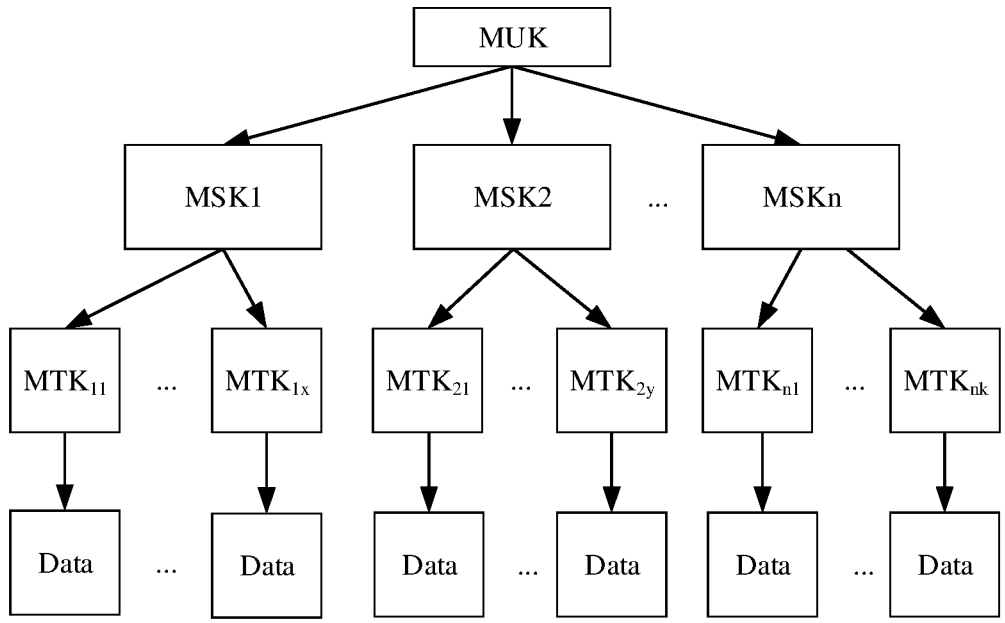
FIG. 2 is a schematic diagram of another key system of a three-layer architecture according to a related technology.

Refer to FIG. 2. FIG. 2 shows a key system of an RTP session. For a same RTP session, one key group includes one or more MSKs, and different MSKs in one key group correspond to different use moments. As shown in FIG. 2, a key group includes n MSKs, which are denoted as MSK1, MSK2, . . . , and MSKn respectively. MSK1 is a key used at a current moment, MSK2 is a key used at a next moment, and use moments of other MSKs in the key group are deduced by analogy.

After a terminal device completes multicast user service registration, a BM-SC selects a sending occasion, and sends an MSK corresponding to a multicast service to the terminal device. A transport protocol used in an MSK transmission process is a MIKEY protocol. In addition, different MSKs have different identifiers. An MSK identifier includes a mobile country code (MCC) || mobile network code (MNC) part, a key group part, and a key number part. That is, the MSK identifier is implemented as "MCC || MNC+key group part+key number part". The "MCC || MNC part" indicates that the MNC is appended after the MCC to form a common character string. The "MCC || MNC part" identifies a public land mobile network (PLMN), the key group part identifies the BM-SC, and the key number identifies a key number, such as a current moment or a next moment.

The BM-SC generates an MTK. Distribution of the MTK is protected by an MSK. As shown in FIG. 2, MSK1 protects distribution of $MTK_{11}$, $MTK_{12}$, . . . , $MTK_{1x}$, and the like. MSK2 protects distribution of $MTK_{21}$, $MTK_{22}$, . . . , $MTK_{2y}$, and the like. MSKn protects distribution of $MTK_{n1}$, $MTK_{n2}$, . . . , $MTK_{nk}$, and the like.

In a service data transmission process, the BM-SC sends service data and an MTK identifier to the terminal device. Correspondingly, the terminal device receives the service data and the MTK identifier from the BM-SC. The service data is data encrypted by using an MTK corresponding to the MTK identifier. The terminal device searches for the corresponding MTK based on the MTK identifier, and performs security deprotection on the service data by using the found MTK. Herein, the MTK identifier includes the following parts: a key block part (key group part), a key number part, and an MTK identifier (identity, ID).

Figure 3:
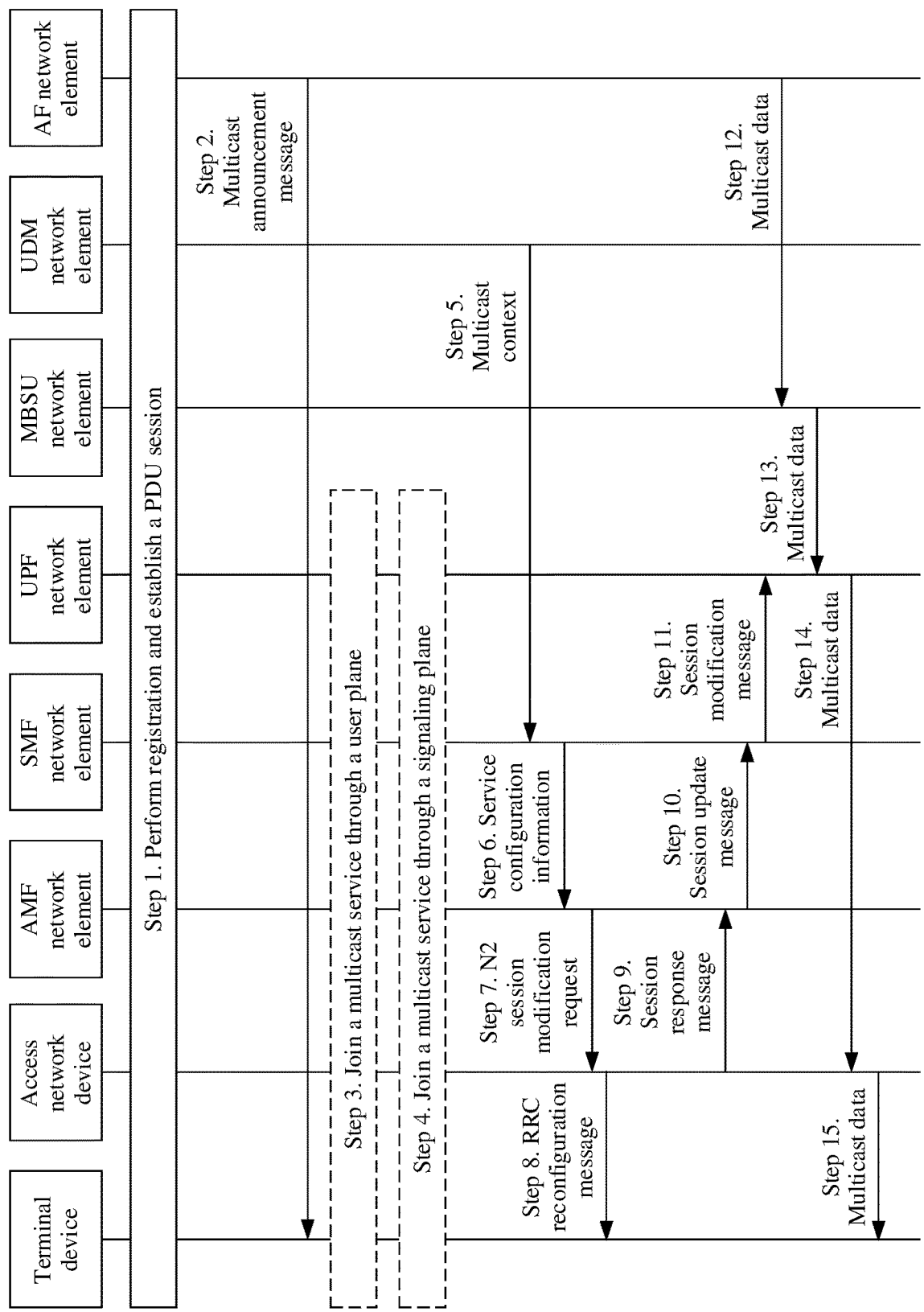
FIG. 3 is a schematic flowchart of a data transmission method according to a related technology.

In a 5th generation (5G) mobile communication system, a data transmission process of a multicast service is shown in FIG. 3, and specific steps are as follows:

Step 1. A terminal device completes registration with a network, and the terminal device establishes a protocol data unit (PDU) session with an application function (AF) network element.

Step 2. The AF network element sends a multicast announcement message to the terminal device at an application layer. Correspondingly, the terminal device receives the multicast announcement message from the AF network element.

The multicast announcement message is for notifying the terminal device to start to provide a multicast service. The multicast announcement message further includes an internet protocol (IP) address of the multicast service.

Step 3. The terminal device joins the multicast service through a user plane.

A user plane function (UPF) network element serves as a multicast router. Herein, the UPF network element sends a message to a session management function (SMF) network element, to notify the SMF network element of the IP address of the multicast service.

Step 4. The terminal device joins the multicast service through a signaling plane.

Herein, the terminal device sends a PDU session modification request to an access and mobility management function (AMF) network element. Correspondingly, the AMF network element receives the PDU session modification request from the terminal device.

The AMF network element sends a PDU session update context message (PDU session update SMcontext) to the SMF network element. Correspondingly, the SMF network element receives the PDU session update context message from the AMF network element.

Both the PDU session modification request and the PDU session update context message are written into the IP address of the multicast service. In this way, the SMF network element can obtain the IP address of the multicast service.

It should be noted that, in an actual application process, the terminal device may select a manner corresponding to step 3 or step 4 to join the multicast service.

Step 5. The SMF network element obtains a multicast context corresponding to the IP address of the multicast service.

For example, the SMF network element sends a first request message to a unified data management (UDM) network element. Correspondingly, the UDM network element receives the first request message from the SMF network element. The first request message includes the IP address of the multicast service, to request the multicast context corresponding to the IP address of the multicast service. If the UDM network element can provide the multicast context corresponding to the IP address of the multicast service, the UDM network element sends the multicast context corresponding to the IP address of the multicast service to the SMF network element. Correspondingly, the SMF network element receives, from the UDM network element, the multicast context corresponding to the IP address of the multicast service. The multicast context includes a multicast security policy. On the contrary, if the UDM network element cannot provide the multicast context corresponding to the IP address of the multicast service, the UDM network element sends a failure message to the SMF network element. The SMF network element sends a second request message to the UDM network element, to request subscription data. The SMF network element receives the subscription data from the UDM network element. The subscription data includes an allowed PDU session type, an allowed service and session continuity (SSC) mode, an SMF-associated external parameter, a user plane security policy, and the like. The SMF network element creates, based on the subscription data, the multicast context corresponding to the IP address of the multicast service.

Step 6. The SMF network element sends service configuration information to the AMF network element. Correspondingly, the AMF network element receives the service configuration information from the SMF network element.

The service configuration information includes the multicast context, a dedicated quality of service (QoS) rule, and the like.

Step 7. The AMF network element sends an N2 session modification request to an access network device. Correspondingly, the access network device receives the N2 session modification request from the AMF network element.

The N2 session modification request includes the service configuration information.

Step 8. The access network device sends a radio resource control (RRC) reconfiguration message to the terminal device. Correspondingly, the terminal device receives the RRC reconfiguration message from the access network device.

For example, when the access network device determines, based on common information, that the service is for transmitting multicast data (for example, the service is a service jointly received by a plurality of terminal devices), the access network device associates the service with a common data channel between the UPF network element and the access network device. The common data channel may be an established channel, or may be a channel that is triggered to be established in the foregoing case. In this case, the access network device sends the RRC reconfiguration message to the terminal device, to notify the terminal device that a channel for receiving the multicast data is the common data channel. The service configuration information includes the common information.

After the terminal device obtains the RRC reconfiguration message, the terminal device sends an RRC reconfiguration acknowledgment to the access network device. Correspondingly, the access network device receives the RRC reconfiguration acknowledgment from the terminal device.

Step 9. The access network device sends a session response message to the AMF network element. Correspondingly, the AMF network element receives the session response message from the access network device.

The session response message includes an IP address and a general packet radio service tunneling protocol-user plane (GTP-U) tunnel endpoint identifier (TEID) of the access network device.

Step 10. The AMF network element sends a session update message to the SMF network element. Correspondingly, the SMF network element receives the session update message from the AMF network element.

The session update message includes the IP address and the GTP-U TEID of the access network device.

Step 11. The SMF network element sends a session modification message to the UPF network element. Correspondingly, the UPF network element receives the session modification message from the SMF network element.

The session modification message includes the IP address and the GTP-U TEID of the access network device.

The UPF network element establishes a bearer between the UPF and the access network device based on the IP address and the GTP-U TEID of the access network device, to transmit the multicast data.

Step 12. The AF network element sends the multicast data to a multicast/broadcast service user plane (MBSU) network element. Correspondingly, the MBSU network element receives the multicast data from the AF network element.

The MBSU network element may also be replaced with a user packet data network gateway (UPGW). Both the MBSU network element and the UPGW may be independent network elements, or may be parts of the UPF network element (in other words, both the MBSU network element and the UPGW may be integrated with the UPF network element).

Step 13. The MBSU network element sends the multicast data to the UPF network element. Correspondingly, the UPF network element receives the multicast data from the MBSU network element.

Step 14. The UPF network element sends the multicast data to the access network device. Correspondingly, the access network device receives the multicast data from the UPF network element.

Step 15. The access network device sends the multicast data to the terminal device. Correspondingly, the terminal device receives the multicast data from the access network device.

In conclusion, to meet security requirements in the RTP/FULTE protocol, a three-layer key architecture is used in an LTE network. An architecture of the 5G network is different from an architecture of the LTE network, and the 5G system has not defined a security protection processing procedure for MBS service data. If the 5G system does not use the RTP protocol or the FLUTE protocol, but still uses the foregoing key system of the three-layer architecture, there is extra redundancy in a signaling procedure and transmission load of the 5G system. In addition, in the LTE network, an MUK is generated by a terminal device and a network device through negotiation by using a GBA system. In this case, an operator needs to deploy a GBA system in addition to a multimedia broadcast/multicast service system. Therefore, in a 5G broadcast/multicast service, how to simplify a secure transmission procedure of the multicast service data and prevent an unauthorized user from obtaining the multicast service data is a problem that needs to be resolved.

In view of this, embodiments of the present disclosure provide a key management method. A communication system to which the key management method in embodiments of the present disclosure is applicable is first described. The communication system may be a communication system supporting a 5G mobile communication technology, for example, a new radio (NR) access technology. Alternatively, the communication system may be a communication system supporting a plurality of wireless technologies, for example, a communication system supporting an LTE technology and an NR access technology. In addition, the communication system may alternatively be applicable to a future-oriented communication technology.

Figure 4A:
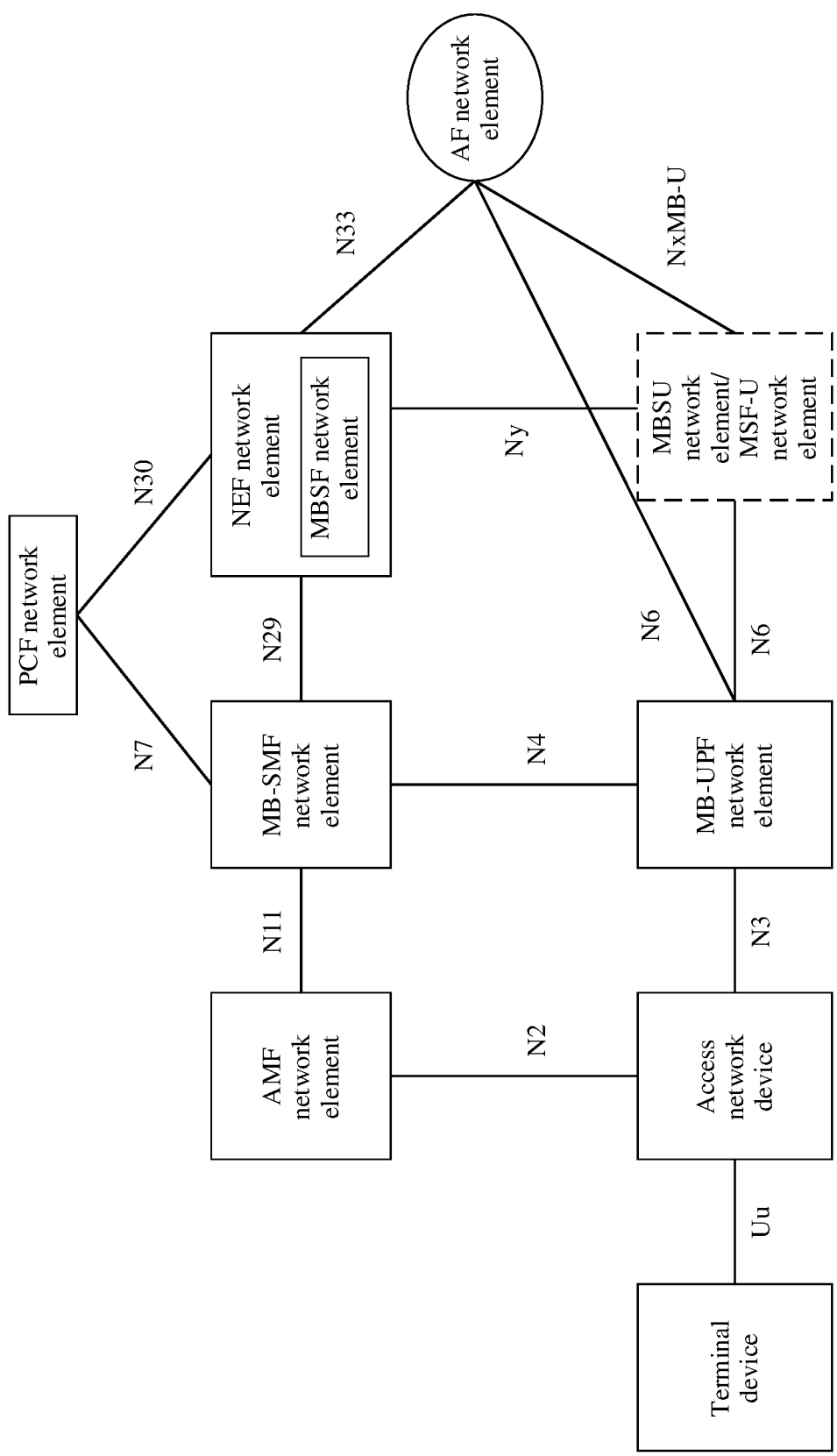
FIG. 4(a) is a schematic diagram of an architecture of a communication system according to an embodiment of the present disclosure.

Refer to FIG. 4(a). A network architecture of the communication system is described by using the communication system supporting the 5G mobile communication technology as an example. Network elements in the 5G network architecture include a terminal device, an access network device, a UPF network element, a multicast/broadcast service user plane (MBSU) network element, a multicast service function (MSF) network element, an application function (AF) network element, an AMF network element, an SMF network element, a network exposure function (NEF) network element, a multicast/broadcast service function (MBSF) network element, a policy control function (PCF) network element, and the like.

The terminal device is also referred to as user equipment (UE), a mobile station (MS), a mobile terminal (MT), or the like, is a device that provides a voice/data connectivity for a user, for example, a handheld device or a vehicle-mounted device having a wireless connection function. The terminal device may be specifically a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home, a terminal device in a future 5G communication network or a communication network after 5G, or the like. This is not limited in embodiments of the present disclosure.

The access network device may be a radio access network (RAN) device, and is an apparatus that is deployed in a radio access network to provide a wireless communication function. Optionally, the RAN device in embodiments of the present disclosure includes, for example, but is not limited to, a macro base station, a micro base station (also referred to as a small cell), a relay station, a transmission reception point (TRP), a next generation network node (gNodeB, gNB), an evolved NodeB (ng evolved Node B, ng-eNB) connected to a next-generation core network, and the like, and may further include a RAN device of a non-3rd generation partnership project (3GPP) system such as a wireless local area network (WLAN) access device.

The UPF network element is a function network element of a user plane, and is mainly responsible for forwarding and receiving user data in a terminal device. The UPF network element may receive the user data from a data network (DN), and transmit the user data to the terminal device through the access network device. Alternatively, the UPF network element may receive the user data from the terminal device through the access network device, and forward the user data to the data network. The UPF network element has resource transmission and scheduling functions that serve the terminal device, which are managed and controlled by the SMF network element. A UPF network element that supports a multicast/broadcast session may also be referred to as an MB-UPF network element.

The MBSU network element mainly processes user plane data to meet service layer function and management requirements. Herein, the MBSU network element may be a network element of a logical function, and is co-deployed with another network element.

The MSF network element mainly provides a service layer function. For example, the MSF network element provides a signaling plane function and a user plane function, specifically including multicast service configuration, multicast service management, data encoding, data transmission, and the like. An MSF network element that provides a user plane function may also be denoted as an "MSF-U" network element, and an MSF network element that provides a control plane function may also be denoted as an "MSF-C" network element. Herein, the MSF network element may be a network element of a logical function, and is co-deployed with another network element.

The AF network element may interact with a 3GPP core network. The AF network element may be specifically an application server, and may be configured to interact with the PCF network element to customize a policy for an application.

The AMF network element has functions such as mobility management, registration management, connection management, lawful interception, access authentication, and access authorization of the terminal device, and supports transmission of session management (SM) information between the terminal device and the SMF network element.

The SMF network element has functions such as session management and roaming. The session management function includes, for example, session establishment, modification, and release. The roaming function may include charging data collection and supporting of signaling transmission for authentication/authorization with an external data network. An SMF network element that supports a multicast/broadcast session may also be referred to as an MB-SMF network element.

The NEF network element may provide network functions such as externally providing a service or a capability of a network element, an application function, and edge computing. Optionally, the NEF network element further provides an application function of providing information to the 3GPP core network, for example, in a mobility mode and a communication mode. In this case, the NEF network element may further provide a network function of authenticating, authorizing, and limiting the foregoing application function.

The MBSF network element may be a part of the NEF network element, or may be an independent network element. The MBSF network element is configured to process multicast/broadcast service management, provide an interface from a core network to an application server, and authorize a terminal device to join a multicast/broadcast session.

The PCF network element provides a user subscription information management function, a policy control function, a charging policy control function, quality of service (QoS) control, and the like.

The terminal device communicates with the access network device through a Uu interface, the access network device communicates with the AMF network element through an N2 interface, the access network device communicates with the UPF network element through an N3 interface, the UPF network element communicates with the SMF network element through an N4 interface, the UPF network element accesses the AF network element and the MBSU network element through N6 interfaces, the MBSU network element communicates with the AF network element through an NxMB-U interface, and the MBSU network element communicates with the NEF network element through an Ny interface. The AMF network element communicates with the SMF network element through an N11 interface. The SMF network element communicates with the PCF network element through an N7 interface. The PCF network element communicates with the NEF network element through an N30 interface. The NEF network element communicates with the AF network element through an N33 interface.

Figure 4B:
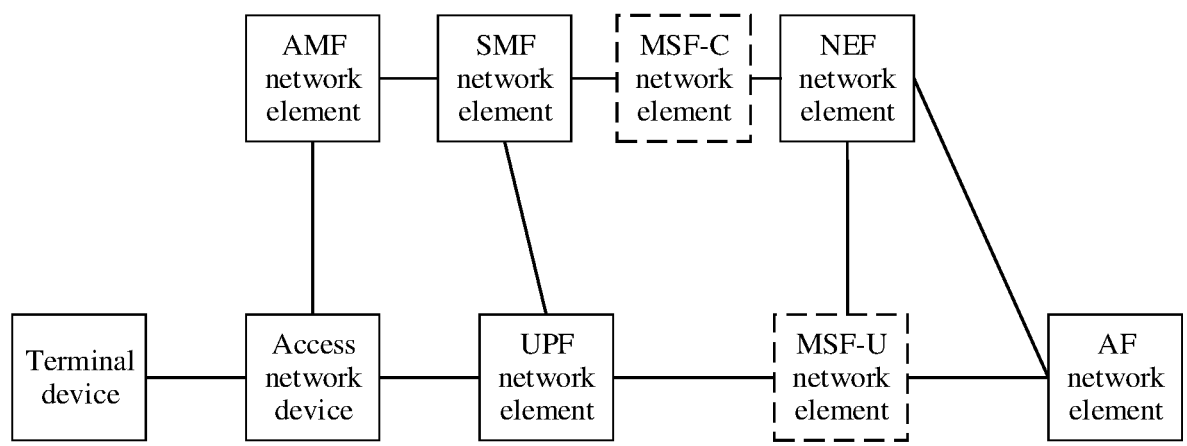
FIG. 4(b) is a schematic diagram of an architecture of another communication system according to an embodiment of the present disclosure.

Refer to FIG. 4(b). An embodiment of the present disclosure provides another network architecture still by using the communication system supporting the 5G mobile communication technology as an example. Network elements in the 5G network architecture include a terminal device, an access network device, a UPF network element, an MSF-U network element, an AF network element, an AMF network element, an SMF network element, an MSF-C network element, an NEF network element, and the like. Herein, for descriptions of each network element, refer to related descriptions in FIG. 4(a). Details are not described herein again. The MSF-U network element and the MSF-C network element each may be a network element of a logical function, and each are co-deployed with another network element.

The communication system and a service scenario described in embodiments of the present disclosure are intended to describe the technical solutions in embodiments of the present disclosure more clearly, but constitute no limitation on the technical solutions provided in embodiments of the present disclosure. A person of ordinary skill in the art may learn that the technical solutions provided in embodiments of the present disclosure are also applicable to a similar technical problem as a network architecture evolves and a new service scenario emerges.

The following describes in detail the key management method provided in embodiments of the present disclosure.

It should be noted that, in the following embodiments of the present disclosure, names of messages between network elements, names of parameters in messages, or the like are merely examples, and there may be other names during specific implementation. In embodiments of the present disclosure, a target key includes at least one of a target MSK, a first sub-key, or a second sub-key. Both the first sub-key and the second sub-key correspond to the target MSK, the first sub-key is for confidentiality protection calculation, and the second sub-key is for integrity protection calculation. The first sub-key may be denoted as MSK_enc, and the second sub-key may be denoted as MSK_int. Both a third sub-key and a fourth sub-key correspond to a target MTK, the third sub-key is for confidentiality protection calculation, and the fourth sub-key is for integrity protection calculation. The third sub-key may be denoted as MTK_enc, and the fourth sub-key may be denoted as MTK_int. This is uniformly described herein, and details are not described below again.

An embodiment of the present disclosure provides a first key management method, and the key management method is applied to an MBS communication process. A terminal device completes a registration process and a PDU session establishment process, and joins a multicast service. For details, refer to related descriptions of step 1 to step 5 in FIG. 3. Details are not described herein again. After joining the multicast service, the terminal device performs a key management method shown in FIG. 5A and FIG. 5B. Specific steps are as follows:

Phase 1: MUK negotiation. In this phase, both the terminal device and a multicast user-plane processing network element obtain an MUK. A process of obtaining the MUK may be implemented by using the 5G GBA protocol or the authentication and key management for applications (AKMA) protocol. Details are not described herein. Alternatively, an MUK negotiation manner described in embodiments of the present disclosure may be used in a process of obtaining the MUK. For a specific implementation process, refer to related descriptions of S501 to S509.

S501. A key generation network element obtains the MUK.

The key generation network element is an SMF network element, an AMF network element, or an AUSF network element.

For example, the key generation network element initiates a processing process of "obtaining the MUK" only when a specific trigger condition is met. Herein, the key generation network element determines, based on a multicast service authentication or authorization result, whether to initiate the processing process of "obtaining the MUK". It may be understood that, when multicast service authentication of the key generation network element succeeds or the terminal device is authorized, the key generation network element initiates the processing procedure of "obtaining the MUK". On the contrary, when the multicast service authentication of the key generation network element fails or the terminal device is not authorized, the key generation network element does not initiate the processing process of "obtaining the MUK". The multicast service authentication may be secondary authentication, or may be a specific authentication procedure. This is not limited in this embodiment of the present disclosure. Herein, the "secondary authentication" is an authentication process performed between a terminal device and an AF network element after primary authentication between the terminal device and a core network device succeeds. An extensible authentication protocol (EAP) authentication framework is used in the authentication process. The key generation network element (for example, an SMF network element) may be used as an EAP authenticator, the terminal device is used as an EAP client, and the AF network element is used as an EAP server. The "specific authentication procedure" is an authentication procedure dedicated to a multicast service, for example, an authentication procedure performed between the terminal device and the AF network element. An EAP authentication framework or another authentication protocol is used in this authentication process.

The key generation network element receives an authentication result from the AF network element or a multicast user-plane processing network element, and then the key generation network element determines, based on the authentication result, whether the multicast service authentication succeeds. Herein, "authorization" refers to granting a right of multicast access to the terminal device. The key generation network element obtains subscription data of the terminal device from a UDM network element. The subscription data of the terminal device includes indication information, and the indication information indicates whether the terminal device is allowed to obtain the multicast service. The key generation network element determines, based on the subscription data of the terminal device, whether to perform authorization.

Figure 6A:
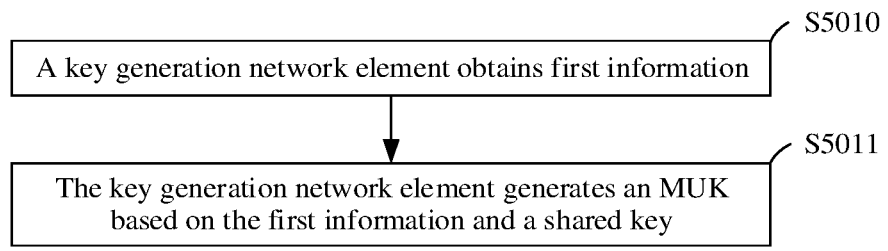
FIG. 6(a) is a schematic flowchart of another key management method according to an embodiment of the present disclosure.

For example, the MUK is for protecting distribution of an MSK. There is a plurality of manners of obtaining the MUK, and the manners may be, for example, but are not limited to, the following two cases:

Case 1: When the key generation network element is an SMF network element, an AMF network element, or an AUSF network element, the key generation network element generates the MUK. A specific implementation process is shown in FIG. 6(*a*).

S5010. The key generation network element obtains first information.

The first information includes at least one of the following information:

1. Identifier of the multicast user-plane processing network element: Herein, the identifier of the multicast user-plane processing network element may be information preconfigured on the key generation network element, or may be information obtained after the key generation network element requests the multicast user-plane processing network element. The multicast user-plane processing network element may be one of the following network elements: an MBSU element, a UPF network element, an MSF network element, or a UPGW. When the multicast user-plane processing network element is implemented as an MBSU network element, the identifier of the multicast user-plane processing network element is an identifier of the MBSU network element. Security protection for the multicast service is implemented between the terminal device and the MBSU network element. When the multicast user-plane processing network element is implemented as a UPF network element, the identifier of the multicast user-plane processing network element is an identifier of the UPF network element. Security protection for the multicast service is implemented between the terminal device and the UPF network element. When the multicast user-plane processing network element is implemented as a UPGW, the identifier of the multicast user-plane processing network element is an identifier of the UPGW. Security protection for the multicast service is implemented between the terminal device and the UPGW. The UPGW may be an independent network element, or may be integrated with one of the UPF network element, the MBSU network element, or the MSF network element. When the multicast user-plane processing network element is implemented as the MSF network element, the identifier of the multicast user-plane processing network element is an identifier of the MSF network element. Security protection for the multicast service is implemented between the terminal device and the MSF network element.

2. First parameter: Herein, the first parameter may be a parameter determined based on at least one of a first random number, a first count value, or a first timestamp. For example, the first parameter is the first random number, the first count value, or the first timestamp. The first parameter is generated and maintained by the key generation network element.

3. ID of the multicast service: Herein, the ID of the multicast service may be implemented as an IP address of the multicast service, or may be a group identifier of the multicast service. When the key generation network element is implemented as an SMF network element, for a specific implementation process of "obtaining, by the SMF network element, the IP address of the multicast service", refer to related descriptions of step 1 to step 4 in FIG. 3. Details are not described herein again.

S5011. The key generation network element generates the MUK based on the first information and a shared key.

For example, in a process in which the key generation network element derives the MUK, an input key for calculating the MUK is the shared key, an input parameter for calculating the MUK is the first information, and a derivation algorithm for calculating the MUK may be a hash message authentication code (HMAC) algorithm.

The shared key is a key shared between the terminal device and the core network device. Herein, the shared key is an authentication server function key Kausf, a security anchor function key Kseaf, or a key derived from Kausf.

Specific functions of each piece of information in the first information in an MUK generation process are as follows:

The identifier of the multicast user-plane processing network element is used to isolate security protection between different network elements (such as the MBSU network element, the UPF network element, and the UPGW). For example, when there is a plurality of multicast user-plane processing network elements in a PLMN, identifiers of the multicast user-plane processing network elements correspond to a unique multicast user-plane processing network element. When there is a unique multicast user-plane processing network element (for example, an MBSU network element, a UPF network element, a UPGW, or an MSF network element) in a PLMN, an identifier of the multicast user-plane processing network element may be set to a fixed value, or may not be used as an "input parameter for calculating an MUK".

The first parameter is used to isolate MUKs of different time sequences. To be specific, the terminal device is allowed to access the multicast service at a moment 1, and both the terminal device and the core network device can perform derivation based on a first parameter corresponding to the moment 1, to obtain an MUK corresponding to the moment 1. The MUK corresponding to moment 1 protects distribution of a target MSK. In this way, when the terminal device has the MUK corresponding to the moment 1, the terminal device can obtain the target MSK. The terminal device is not allowed to access the multicast service at a moment 2, and the terminal device cannot perform derivation based on a first parameter corresponding to the moment 2, and therefore cannot obtain an MUK corresponding to the moment 2. Distribution of an updated target MSK is protected by the MUK corresponding to the moment 2. In this case, when the terminal device does not have the MUK corresponding to the moment 2, the terminal device cannot obtain the updated target MSK.

The identifier of the multicast service is used to isolate MUKs in different multicast services.

In this way, the key generation network element can generate the MUK based on the shared key and at least one of: the identifier of the multicast user-plane processing network element, the first parameter, and the ID of the multicast service, and further distribute the MUK to the multicast user-plane processing network element.

Figure 6B:
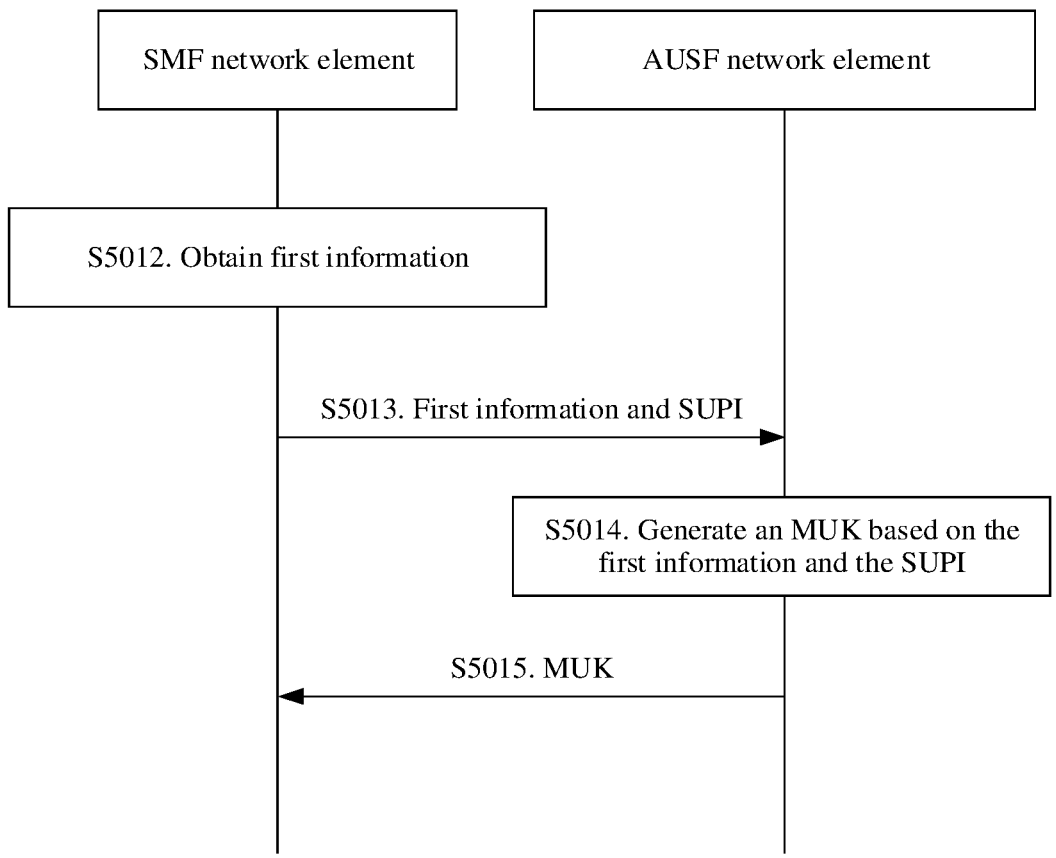
FIG. 6(b) is a schematic flowchart of another key management method according to an embodiment of the present disclosure.

Case 2: When the key generation network element is an SMF network element, the SMF network element obtains the MUK from an AUSF network element. A specific implementation process is shown in FIG. 6(b).

S5012. The SMF network element obtains first information.

For descriptions of the first information, refer to specific descriptions of S5010. Details are not described herein again.

S5013. The SMF network element sends the first information and a subscription permanent identifier (SUPI) to the AUSF network element. Correspondingly, the AUSF network element receives the first information and the SUPI from the SMF network element.

The SUPI can identify a real identity of the terminal device in a 5G system. Herein, for a specific implementation process of "obtaining the SUPI by the SMF network element", refer to a conventional technology. Details are not described herein.

For example, both the first information and the SUPI may be carried in a key request message.

S5014. The AUSF network element generates the MUK based on the first information and the SUPI.

For example, the AUSF network element obtains, through indexing by using the SUPI, a shared key corresponding to the terminal device. Herein, for descriptions of the shared key, refer to related descriptions of S5012. Details are not described herein again. For a specific implementation process in which the AUSF network element generates the MUK based on the first information and the shared key, refer to related descriptions of S5012. Details are not described herein again.

S5015. The AUSF network element sends the MUK to the SMF network element. Correspondingly, the SMF network element receives the MUK from the AUSF network element.

For example, the MUK is carried in the key response message.

In other words, when the key generation network element is implemented as the SMF network element, the SMF network element can provide at least one of an identifier of the multicast user-plane processing network element, a first parameter, and an ID of the multicast service for the AUSF network element, so that the AUSF network element generates the MUK. In this way, the SMF network element can obtain the MUK from the AUSF network element, and then distribute the MUK to the multicast user-plane processing network element.

It should be noted that if the AUSF network element cannot generate the MUK, the AUSF network element sends a failure message to the SMF network element. Correspondingly, the SMF network element receives the failure message from the AUSF network element. The failure message includes a failure cause value. The failure cause value indicates a reason why the AUSF cannot generate the MUK, for example, a derivation parameter stored in the AUSF network element is unavailable.

S502. The key generation network element sends the MUK to the multicast user-plane processing network element. Correspondingly, the multicast user-plane processing network element receives the MUK from the key generation network element.

For example, the MUK is carried in a key notification message. After the multicast user-plane processing network element receives the key notification message from the key generation network element, the multicast user-plane processing network element sends a response message to the key generation network element. Correspondingly, the key generation network element receives the response message from the multicast user-plane processing network element. The response message indicates that the multicast user-plane processing network element has received the MUK.

In some embodiments, the key generation network element sends time information corresponding to the MUK to the multicast user-plane processing network element. Correspondingly, the multicast user-plane processing network element receives the time information corresponding to the MUK from the key generation network element. The time information corresponding to the MUK indicates valid time of the MUK. To be specific, within the valid time of the MUK, the multicast user-plane processing network element uses the MUK to protect distribution of the target MSK. In this way, the terminal device can obtain the target MSK. On the contrary, the MUK is invalid beyond the valid time of the MUK, and the multicast user-plane processing network element no longer distributes the target MSK. In this case, the terminal device cannot obtain the target MSK.

Therefore, when the key generation network element provides the MUK for the multicast user-plane processing network element, the key generation network element can further indicate the valid time of the MUK, to meet use requirements of the multicast user-plane processing network element in different time periods.

In some embodiments, the key generation network element can further determine a target security policy, and provide the target security policy for the multicast user-plane processing network element. A specific implementation process is shown in S503 and S504 in FIG. 5A and FIG. 5B.

S503. The key generation network element determines the target security policy.

The target security policy includes at least one of a confidentiality protection policy and an integrity protection policy. Herein, the confidentiality protection policy indicates whether encryption protection is to be performed on data between the terminal device and the multicast user-plane processing network element. The integrity protection policy indicates whether integrity protection is to be performed on the data between the terminal device and the multicast user-plane processing network element.

For example, there are two types of target security policies. A first type of target security policy includes two possible cases: "required" and "not required". Herein, "required" means that security protection between the terminal device and the multicast user-plane processing network element needs to be performed. "Not required" means that security protection between the terminal device and the multicast user-plane processing network element does not need to be performed. A second type of target security policy includes three possible cases: "required", "not required", and "preferred". Herein, meanings of "required" and "not required" are the same as those in the "first type of target security policy". Details are not described herein again. "Preferred" means that security protection between the terminal device and the multicast user-plane processing network element may or may not be performed.

For example, a specific implementation process of S503 may be, for example, but is not limited to, the following example 1 and example 2:

Example 1: The key generation network element determines the target security policy based on a transmission status of a target MTK and a basic policy.

There are two transmission statuses of the target MTK: The multicast user-plane processing network element sends the target MTK (or second information for generating the target MTK, where for details, refer to descriptions in S1002) to the terminal device, and the multicast user-plane processing network element does not need to send the target MTK (or the second information for generating the target MTK) to the terminal device.

The basic policy includes a multicast security policy in a multicast context or a user plane security policy in UDM subscription data. Herein, for a specific implementation process in which the key generation network element (for example, an SMF network element) obtains the "multicast security policy in the multicast context", refer to related descriptions of step 5 in FIG. 3. Details are not described herein again. For a specific implementation process in which the key generation network element (for example, an SMF network element) obtains the "user plane security policy in the UDM subscription data", refer to related descriptions of step 5 in FIG. 3. Details are not described herein again.

Herein, in Example 1, S503 may be specifically implemented as the following step 1 and step 2.

Step 1. The key generation network element determines a type of the target security policy based on the transmission status of the target MTK.

When the target MTK does not need to be generated or transmitted, the key generation network element determines that the type of the target security policy is the first type. In other words, the target security policy includes two possible cases: "required" and "not required". On the contrary, when the target MTK is generated and transmitted, the key generation network element determines that the type of the target security policy is the second type. In other words, the target security policy includes three possible cases: "required", "not required", and "preferred".

Step 2. The key generation network element determines the target security policy based on the type of the target security policy and the basic policy.

When the key generation network element determines that the type of the target security policy is the first type, if the basic policy indicates that security protection between the terminal device and the multicast user-plane processing network element needs to be performed, the target security policy is consistent with the basic policy, and security protection between the terminal device and the multicast user-plane processing network element is enabled. If the basic policy indicates that security protection between the terminal device and the multicast user-plane processing network element does not need to be performed, the target security policy is consistent with the basic policy, and security protection between the terminal device and the multicast user-plane processing network element is disabled. If the basic policy indicates "preferred", to be specific, security protection between the terminal device and the multicast user-plane processing network element may or may not be performed, the key generation network element determines the target security policy based on a local configuration, to be specific, determines "whether security protection between the terminal device and the multicast user-plane processing network element is required". For example, when a QoS rule requires that a delay be less than a specific threshold, the key generation network element determines that the target security policy is "not required". In other words, security protection between the terminal device and the multicast user-plane processing network element is not required. As described above, when "security protection between the terminal device and the multicast user-plane processing network element needs to be performed", security protection between the terminal device and the multicast user-plane processing network element is enabled. When "security protection between the terminal device and the multicast user-plane processing network element does not need to be performed", security protection between the terminal device and the multicast user-plane processing network element is disabled. In this way, signaling indicating a "security protection status" does not need to be transmitted between the terminal device and the multicast user-plane processing network element, in other words, the terminal device and the multicast user-plane processing network element do not need to negotiate about a multicast security activation status, to reduce signaling overheads.

For example, when the key generation network element determines that the type of the target security policy is the second type, the key generation network element may determine that the target security policy is consistent with the basic policy. To be specific, if the basic policy indicates that security protection between the terminal device and the multicast user-plane processing network element needs to be performed, security protection between the terminal device and the multicast user-plane processing network element is enabled. If the basic policy indicates that security protection between the terminal device and the multicast user-plane processing network element does not need to be performed, security protection between the terminal device and the multicast user-plane processing network element is disabled. If the basic policy indicates "preferred", to be specific, security protection between the terminal device and the multicast user-plane processing network element may or may not be performed, the target security policy still indicates "preferred". In this case, the multicast user-plane processing network element determines "whether to perform security protection", and then the multicast user-plane processing network element notifies the terminal device of "whether to perform security protection". For details, refer to related descriptions of S5121. Details are not described herein again.

In this way, the key generation network element can determine the target security policy based on the basic policy and the transmission status of the target MTK, to provide the target security policy for the multicast user-plane processing network element.

Example 2: When the key generation network element is used as a network element for determining a security protection status, the multicast user-plane processing network element does not need to determine "whether to perform security protection", and the multicast user-plane processing network element no longer notifies the terminal device of "whether to perform security protection". Herein, there are two types of security protection: data encryption protection and integrity protection. The "security protection status" means that security protection between the terminal device and the multicast user-plane processing network element is enabled or disabled, for example, data encryption protection is enabled or disabled, or integrity protection is enabled or disabled. In this case, the key generation network element determines that the type of the target security policy is the first type. In other words, the target security policy includes two possible cases: "required" and "not required". Then, the key generation network element determines the target security policy based on the type of the target security policy and a basic policy. For details, refer to related descriptions of step 2 in Example 1. Details are not described herein again.

It should be noted that a network element that determines the target security policy and the key generation network element may be the same, similar to the specific implementation process described in S503. Certainly, the network element that determines the target security policy and the key generation network element may alternatively be different network elements. A specific process is consistent with that described in S503 and S504, and only network elements that perform the processing process are different.

S504. The key generation network element sends the target security policy to the multicast user-plane processing network element. Correspondingly, the multicast user-plane processing network element receives the target security policy from the key generation network element.

For example, when the target security policy is implemented as the confidentiality protection policy, the key generation network element indicates, to the multicast user-plane processing network element, whether to perform data encryption protection, or the key generation network element indicates the multicast user-plane processing network element to determine whether to perform data encryption protection. When the target security policy is implemented as the integrity protection policy, the key generation network element indicates, to the multicast user-plane processing network element, whether to perform data integrity protection, or the key generation network element indicates the multicast user-plane processing network element to determine whether to perform data integrity protection.

In this way, the key generation network element can provide the target security policy for the multicast user-plane processing network element, so that the multicast user-plane processing network element performs security protection on multicast service data based on the target security policy.

In some embodiments, the key generation network element can further send a security algorithm to the multicast user-plane processing network element. A specific implementation process is shown in S505 and S506 in FIG. 5A and FIG. 5B.

S505. The key generation network element determines the security algorithm.

The security algorithm is for data security protection calculation.

For example, the security algorithm includes an encryption algorithm and an integrity protection algorithm. The security algorithm may be coupled with the target security policy. For example, when the target security policy is implemented as the confidentiality protection policy, the security algorithm is the encryption algorithm. When the target security policy is implemented as the integrity protection policy, the security algorithm is the integrity protection algorithm. Certainly, the security algorithm may alternatively be decoupled from the target security policy. For example, when the key generation network element provides the security algorithm for the multicast user-plane processing network element in advance, the security algorithm is at least one of the encryption algorithm and the integrity protection algorithm.

S506. The key generation network element sends the security algorithm to the multicast user-plane processing network element. Correspondingly, the multicast user-plane processing network element receives the security algorithm from the key generation network element.

For example, when the target security policy is implemented as the confidentiality protection policy, the key generation network element sends the encryption algorithm to the multicast user-plane processing network element. When the target security policy is implemented as the integrity protection policy, the key generation network element sends the integrity protection algorithm to the multicast user-plane processing network element.

In this way, the key generation network element can provide the security algorithm for the multicast user-plane processing network element, so that the multicast user-plane processing network element performs security protection on the multicast service data by using the security algorithm.

It should be noted that the MUK, the time information corresponding to the MUK, the target security policy, and the security algorithm may be carried in a same message, for example, a key notification message, or may be carried in different messages. This is not limited in embodiments of the present disclosure.

In some embodiments, the key generation network element can further send the first information to the terminal device, so that the terminal device determines the MUK. A specific implementation process is shown in S507 to S509 in FIG. 5A and FIG. 5B.

S507. The key generation network element sends the first information to an access network device. Correspondingly, the access network device receives the first information from the key generation network element.

For descriptions of the "first information", refer to related descriptions of S5011. Details are not described herein again. Optionally, the first information further includes service configuration information. Herein, for descriptions of the "service configuration information", refer to related descriptions of step 6 in FIG. 3. Details are not described herein again.

For example, when the key generation network element is implemented as the SMF network element, the SMF network element sends the first information to an AMF network element. Correspondingly, the AMF network element receives the first information from the SMF network element. The AMF network element sends the first information to the access network device. Correspondingly, the access network device receives the first information from the AMF network element.

For another example, when the key generation network element is implemented as the AMF network element, the AMF network element sends the first information to the access network device. Correspondingly, the access network device receives the first information from the AMF network element. For example, the first information is carried in a session modification request.

For another example, when the key generation network element is implemented as the AUSF network element, the AUSF network element sends the first information to an SMF network element. Correspondingly, the SMF network element receives the first information from the AUSF network element. The SMF network element sends the first information to the AMF network element. Correspondingly, the AMF network element receives the first information from the SMF network element. The AMF network element sends the first information to the access network device. Correspondingly, the access network device receives the first information from the AMF network element.

S508. The access network device sends the first information to the terminal device. Correspondingly, the terminal device receives the first information from the access network device.

For example, the first information is carried in an RRC reconfiguration message. Herein, for an implementation process of "sending, by the access network device, the RRC reconfiguration message to the terminal device", refer to related descriptions of step 8 in FIG. 3. Details are not described herein again.

S509. The terminal device generates the MUK based on the first information and a shared key.

For descriptions of the shared key, refer to related descriptions of S5012. Details are not described herein again. For a specific implementation process of S509, refer to related descriptions of S5012. Details are not described herein again.

It should be noted that when the key generation network element determines that the type of the target security policy is the first type, the key generation network element sends the target security policy to the terminal device. Correspondingly, the terminal device receives the target security policy from the key generation network element. When the key generation network element determines that the type of the target security policy is the second type, the key generation network element may no longer send the target security policy to the terminal device. Alternatively, the terminal device receives security protection status information from the multicast user-plane processing network element. Similarly, when the key generation network element determines the security algorithm, the key generation network element sends the security algorithm to the terminal device. Correspondingly, the terminal device receives the security algorithm from the key generation network element. When the key generation network element determines that the type of the target security policy is the second type, the key generation network element may no longer send the security algorithm to the terminal device. Alternatively, the terminal device receives the security algorithm from the multicast user-plane processing network element. Herein, the target security policy, the security algorithm, and the first information may be carried in a same message, or may be carried in different messages. This is not limited in embodiments of the present disclosure. When the target security policy is transmitted to the terminal device in a control plane message, the multicast user-plane processing network element does not need to provide the target security policy for the terminal device. Similarly, when the security algorithm is transmitted to the terminal device in a control plane message, the multicast user-plane processing network element does not need to provide the security algorithm for the terminal device.

Certainly, it is easy to understand that, regardless of whether the target security policy is of the first type or the second type, the SMF may send neither the target security policy nor the security algorithm to the terminal device, and the multicast user-plane processing network element provides the target security policy and the security algorithm for the terminal device. For details, refer to specific descriptions of S512 to S515. Details are not described herein again.

The foregoing is mainly related descriptions of "MUK negotiation". In this phase, both the terminal device and the multicast user-plane processing network element obtain the MUK.

Phase 2: MSK-level key negotiation. In this phase, both the multicast user-plane processing network element and the terminal device obtain a target key, such as the target MSK, a first sub-key, and a second sub-key. For a specific implementation process, refer to related descriptions of S510 to S515.

S510. The multicast user-plane processing network element obtains the target key.

For example, the multicast user-plane processing network element generates the target key. For a specific implementation process, refer to a conventional technology. Details are not described herein.

For another example, after the key generation network element obtains the target key, the key generation network element sends the target key to the multicast user-plane processing network element. Correspondingly, the multicast user-plane processing network element receives the target key from the key generation network element. For details, refer to related descriptions of S1201 and S1202 in FIG. 12. Details are not described herein.

S511. The multicast user-plane processing network element sends the target key to the terminal device. Correspondingly, the terminal device receives the target key from the multicast user-plane processing network element.

For example, the target key is carried in a key distribution message. Herein, the key distribution message is a multimedia internet key (MIKEY) message. When the multicast user-plane processing network element provides the target key for the terminal device, the target key is carried in a user plane message, and the terminal device obtains the target key from the user plane message.

Figure 7A:
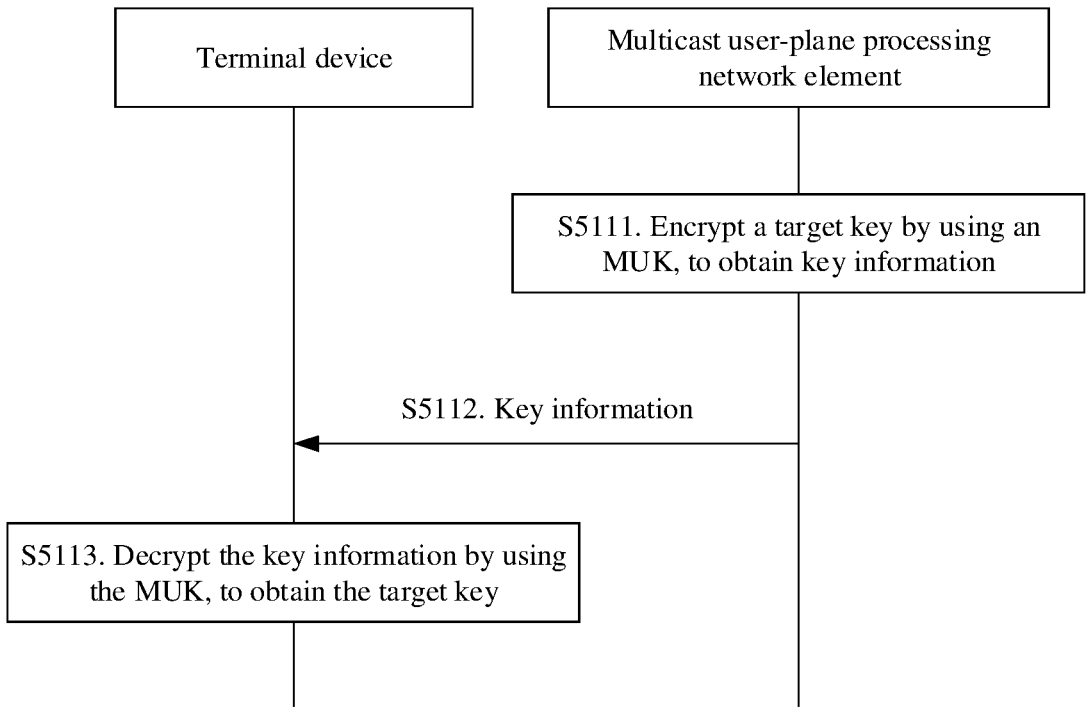
FIG. 7(a) is a schematic flowchart of another key management method according to an embodiment of the present disclosure.

In some embodiments, the MUK protects distribution of the target key. A specific implementation process of S511 may be replaced with S5111 to S5113 shown in FIG. 7(*a*).

S5111. The multicast user-plane processing network element encrypts the target key by using the MUK, to obtain key information.

For example, at a moment 1, the terminal device is allowed to access the multicast service. The multicast user-plane processing network element encrypts the target key by using an MUK corresponding to the moment 1, to obtain the key information. Herein, the moment 1 is within a valid time range of the MUK.

S5112. The multicast user-plane processing network element sends the key information to the terminal device.

Correspondingly, the terminal device receives the key information from the multicast user-plane processing network element.

For example, the key information is carried in the key distribution message.

S5113. The terminal device decrypts the key information by using the MUK, to obtain the target key.

For example, at a moment 1, the terminal device is allowed to access the multicast service. The terminal device has an MUK corresponding to the moment 1. In this way, the terminal device can decrypt the key information by using the MUK corresponding to the moment 1, to obtain the target key.

In other words, key information sent by the multicast user-plane processing network element to different terminal devices is encrypted by using different MUKs. In this way, a terminal device can obtain a target key based on an MUK owned by the terminal device, to improve transmission reliability of the target key.

In some embodiments, to enable the terminal device to obtain an identifier of the target MSK, this embodiment of the present disclosure provides two possible implementations, which are specifically described in the following case 1 and case 2:

Case 1: The multicast user-plane processing network element sends the identifier of the target MSK to the terminal device. Correspondingly, the terminal device receives the identifier of the target MSK from the multicast user-plane processing network element.

For example, the identifier of the target MSK includes two parts: the "ID of the multicast service" and a "key number part". That is, when the identifier of the target MSK is implemented as "ID of the multicast service+key number part", "ID of the multicast service+key number part" is transmitted from the multicast user-plane processing network element to the terminal device. Herein, for descriptions of the "ID of the multicast service", refer to related descriptions of S5011. Details are not described herein again.

In this way, the terminal device can obtain the identifier of the target MSK from the multicast user-plane processing network element.

Case 2: First, the multicast user-plane processing network element sends a key number part to the terminal device. Correspondingly, the terminal device receives the key number part from the multicast user-plane processing network element. Then, the terminal device determines the identifier of the target MSK based on the key number part and the ID of the multicast service.

That the identifier of the target MSK is implemented as "ID of the multicast service+key number part" is still used as an example. The key number part is transmitted from the multicast user-plane processing network element to the terminal device. The terminal device may restore the identifier of the target MSK based on the obtained "ID of the multicast service" and the obtained key number part.

In this way, when the multicast user-plane processing network element provides the key number part for the terminal device, the terminal device can also determine the identifier of the target MSK. Compared with transmitting the "identifier of the target MSK", this reduces transmission resource overheads.

In some embodiments, the multicast user-plane processing network element can further determine the security protection status information, and provide the security protection status information for the terminal device. A specific implementation process is shown in S512 and S513 in FIG. 5A and FIG. 5B.

S512. The multicast user-plane processing network element determines the security protection status information.

The security protection status information indicates a security protection status. The security protection includes at least one of data encryption and integrity verification. For example, the security protection status information indicates that data encryption protection is enabled or disabled, and/or the security protection status information indicates that integrity verification is enabled or disabled.

Figure 7B:
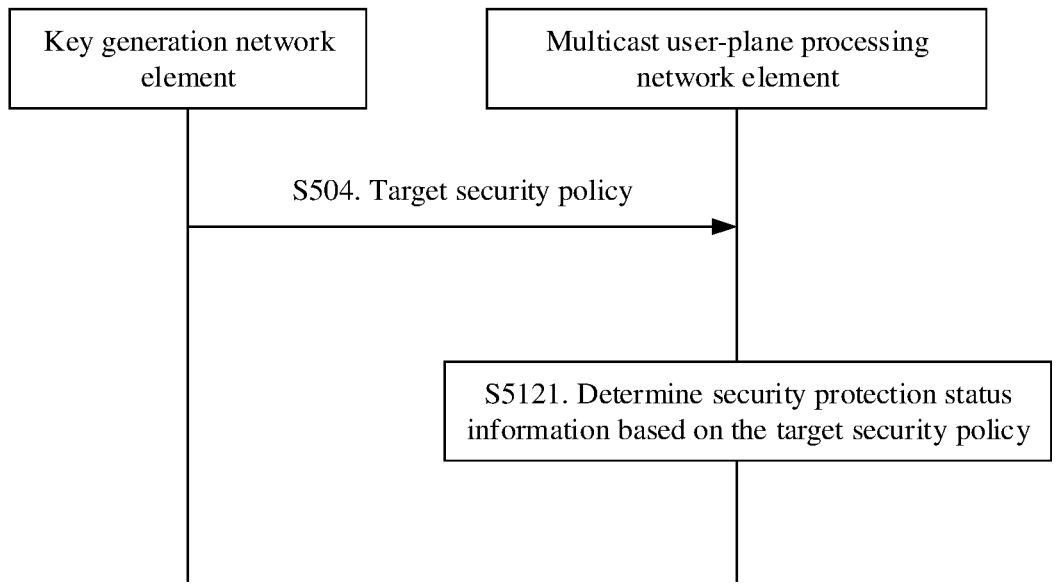
FIG. 7(b) is a schematic flowchart of another key management method according to an embodiment of the present disclosure.

For example, when the multicast user-plane processing network element performs S504, a specific implementation process of S512 may be, for example, but is not limited to, S504 and S5121 shown in FIG. 7(b). S5121 is specifically described as follows:

S5121. The multicast user-plane processing network element determines the security protection status information based on the target security policy.

For example, when the type of the target security policy is the first type, the multicast user-plane processing network element may determine that the security protection status information is consistent with the target security policy. To be specific, if the target security policy indicates that security protection between the terminal device and the multicast user-plane processing network element needs to be performed, security protection between the terminal device and the multicast user-plane processing network element is enabled. If the target security policy indicates that security protection between the terminal device and the multicast user-plane processing network element does not need to be performed, security protection between the terminal device and the multicast user-plane processing network element is disabled.

For example, when the type of the target security policy is the second type, if the target security policy indicates that security protection between the terminal device and the multicast user-plane processing network element needs to be performed or does not need to be performed, the multicast user-plane processing network element may determine that the security protection status information is consistent with the target security policy. For details, refer to related descriptions of "the type of the target security policy is the first type". Details are not described herein again. If the target security policy indicates "preferred", to be specific, security protection between the terminal device and the multicast user-plane processing network element may or may not be performed, the multicast user-plane processing network element determines the security protection status information based on a local configuration. In other words, the multicast user-plane processing network element determines, based on the local configuration, to "enable or disable security protection between the terminal device and the multicast user-plane processing network element".

Optionally, when the key generation network element does not provide the target security policy for the terminal device, the multicast user-plane processing network element performs S513.

S513. The multicast user-plane processing network element sends the security protection status information to the terminal device. Correspondingly, the terminal device receives the security protection status information from the multicast user-plane processing network element.

For example, when the security protection status information corresponds to data encryption protection, the multicast user-plane processing network element indicates, to the terminal device, whether to perform data encryption protection. When the security protection status information corresponds to integrity verification, the multicast user-plane processing network element indicates, to the terminal device, whether to perform integrity verification.

In this way, the multicast user-plane processing network element can provide the security protection status information for the terminal device, so that the terminal device processes target data based on the security protection status information.

In some embodiments, when the key generation network element does not provide the security algorithm for the terminal device, the multicast user-plane processing network element can further determine a security algorithm, and provide the security algorithm for the terminal device. A specific implementation process is shown in S514 and S515 in FIG. 5A and FIG. 5B.

S514. The multicast user-plane processing network element determines the security algorithm.

The security algorithm is for data security protection calculation.

For example, the security algorithm includes an encryption algorithm and an integrity protection algorithm. The security algorithm may be coupled with the security protection status information. For example, when the security protection status information corresponds to confidentiality protection, the security algorithm is the encryption algorithm. When the security protection status information corresponds to integrity protection, the security algorithm is the integrity protection algorithm. Certainly, the security algorithm may alternatively be decoupled from the security protection status information. For example, when the multicast user-plane processing network element provides the security algorithm for the terminal device in advance, the security algorithm is at least one of the encryption algorithm and the integrity protection algorithm.

S515. The multicast user-plane processing network element sends the security algorithm to the terminal device. Correspondingly, the terminal device receives the security algorithm from the multicast user-plane processing network element.

For example, when the security protection status information corresponds to confidentiality protection, the multicast user-plane processing network element sends the encryption algorithm to the terminal device. When the security protection status information corresponds to integrity protection, the multicast user-plane processing network element sends the integrity protection algorithm to the terminal device.

In this way, the multicast user-plane processing network element can provide the security algorithm for the terminal device, so that the terminal device processes the target data by using the security algorithm.

It should be noted that the target key, the key information, the identifier of the target MSK, the key number part, the security protection status information, and the security algorithm may be carried in a same message, for example, an MIKEY message, or may be carried in different messages. This is not limited in embodiments of the present disclosure.

The foregoing is mainly related descriptions of "MSK-level key negotiation". In this phase, after obtaining the target key, the multicast user-plane processing network element can further provide the target key for the terminal device. In this way, both the multicast user-plane processing network element and the terminal device obtain the target key. Certainly, it is easy to understand that "phase 2: MSK-level key negotiation" shown in FIG. 5A and FIG. 5B may also be replaced with "phase 1: MSK-level key negotiation" shown in FIG. 12. For a specific implementation process, refer to related descriptions of S1201 to S1204 in FIG. 12. Details are not described herein.

Phase 3: Data transmission. In this phase, the multicast user-plane processing network element provides the target data for the terminal device. For a specific implementation process, refer to related descriptions of S516 to S518.

S516. The multicast user-plane processing network element performs security protection on the multicast service data by using the target key, to obtain the target data.

For descriptions of the target key, refer to related descriptions of S510. Details are not described herein again. If the multicast user-plane processing network element performs "data encryption" protection but does not perform "integrity verification", the target data includes ciphertext and does not include a message authentication code (MAC). If the multicast user-plane processing network element does not perform "data encryption" protection but performs "integrity verification", the target data includes the multicast service data (which may also be referred to as plaintext) and a MAC. If the multicast user-plane processing network element performs "data encryption" protection and "integrity verification", the target data includes ciphertext and a MAC.

There is a plurality of specific implementations of S516, and the implementations may be, for example, but are not limited to, descriptions in the following four aspects:

First: In terms of a security protection trigger condition, the multicast user-plane processing network element performs security protection only when "the status indicated by the security protection status information is enabled". That is, a specific implementation of S516 is: If the status indicated by the security protection status information is enabled, the multicast user-plane processing network element performs security protection on the multicast service data by using the target key, to obtain the target data. In other words, the multicast user-plane processing network element performs security protection on the multicast service data only when security protection between the terminal device and the multicast user-plane processing network element is enabled, to ensure secure transmission of the multicast service data.

Second: In terms of the security algorithm corresponding to security protection, the multicast user-plane processing network element performs security protection only when obtaining the "security algorithm". For example, when "the multicast user-plane processing network element performs S506" or "the multicast user-plane processing network element receives the security algorithm from the AMF network element", S516 is specifically implemented as follows: The multicast user-plane processing network element performs security protection on the multicast service data by using the security algorithm and the target key, to obtain the target data. Herein, when the security algorithm is implemented as the "encryption algorithm", the multicast user-plane processing network element encrypts the multicast service data by using the encryption algorithm and the target key, to obtain the ciphertext. When the security algorithm is implemented as the "integrity protection algorithm", the multicast user-plane processing network element determines the MAC based on the integrity protection algorithm and the multicast service data. In other words, the multicast user-plane processing network element performs security protection on the multicast service data only when the multicast user-plane processing network element has the security algorithm, to ensure secure transmission of the multicast service data.

Third: In terms of a security protection type, security protection includes two types: data encryption and integrity verification.

When the multicast user-plane processing network element performs "data encryption" protection, the multicast user-plane processing network element encrypts the multicast service data by using the target MSK or the first sub-key, to obtain the ciphertext. The target data includes the ciphertext. Herein, a specific implementation process of encryption may be: inputting the target MSK (or the first sub-key) and the multicast service data into the encryption algorithm for performing an operation, to obtain the ciphertext. In an actual application process, the multicast user-plane processing network element further inputs another information element into the encryption algorithm. For a specific implementation process, refer to a conventional technology. Details are not described herein again.

When the multicast user-plane processing network element performs "integrity verification", the multicast user-plane processing network element determines the MAC based on the multicast service data and at least one of the target MSK and the second sub-key. The target data includes the MAC. Herein, a specific implementation process of "determining the MAC" may be: inputting the target MSK (or the second sub-key) and the multicast service data into the integrity protection algorithm, to obtain the MAC. In an actual application process, the multicast user-plane processing network element further inputs another information element into the integrity protection algorithm. For a specific implementation process, refer to a conventional technology. Details are not described herein.

In this way, if the multicast user-plane processing network element performs "data encryption" protection on the multicast service data, an effect of hiding the data can be achieved. If the multicast user-plane processing network element performs "integrity verification" on the multicast service data, data tampering can be avoided.

Figure 8:
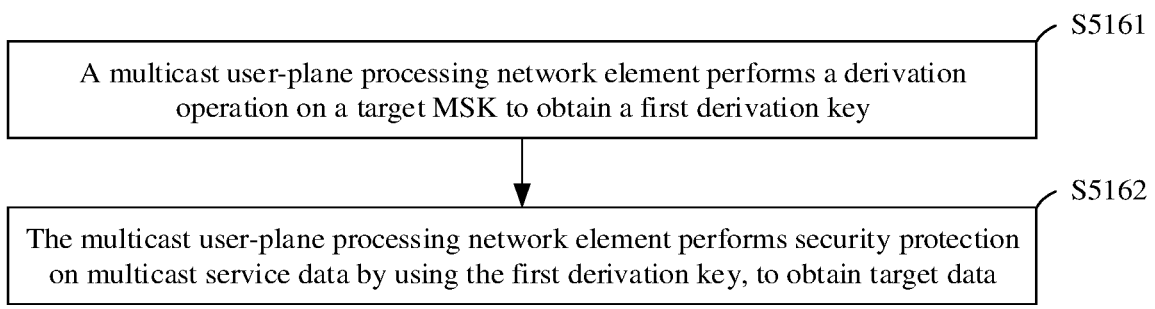
FIG. 8 is a schematic flowchart of another key management method according to an embodiment of the present disclosure.

Fourth: In terms of a key for performing security protection, the key for performing security protection may be the target MSK, or may be a first derivation key determined based on the target MSK, for example, the first sub-key corresponding to the target MSK or the second sub-key corresponding to the target MSK. "Performing security protection on the multicast service data by using the first derivation key" is used as an example. Refer to FIG. 8. S516 may be specifically implemented as S5161 and S5162.

S5161. The multicast user-plane processing network element performs a derivation operation on the target MSK to obtain the first derivation key.

An algorithm of the derivation operation may be an HMAC algorithm. Herein, the first derivation key includes the first sub-key and the second sub-key. For example, S5161 may be specifically implemented as the following Example 1 and Example 2:

Example 1: The multicast user-plane processing network element performs a first derivation operation on the target MSK to obtain the first sub-key.

The first derivation key includes the first sub-key, and the first sub-key is for confidentiality protection calculation and is denoted as MSK_enc. For example, the multicast user-plane processing network element uses the target MSK as an input key, uses the encryption algorithm as an input parameter, and performs a derivation operation by using the HMAC algorithm, to obtain the first sub-key. For a specific implementation process, refer to a conventional technology. Details are not described herein.

In this way, the multicast user-plane processing network element can obtain the first sub-key in a derivation manner by using the target MSK, to perform security protection on the multicast service data.

Example 2: The multicast user-plane processing network element performs a second derivation operation on the target MSK to obtain the second sub-key.

The first derivation key includes the second sub-key, and the second sub-key is for integrity protection calculation and is denoted as MSK_int. For example, the multicast user-plane processing network element uses the target MSK as an input key, uses the integrity protection algorithm as an input parameter, and performs a derivation operation by using the HMAC algorithm, to obtain the second sub-key. For a specific implementation process, refer to a conventional technology. Details are not described herein.

In this way, the multicast user-plane processing network element can obtain the second sub-key in a derivation manner by using the target MSK, to perform security protection on the multicast service data.

S5162. The multicast user-plane processing network element performs security protection on the multicast service data by using the first derivation key, to obtain the target data.

For example, the multicast user-plane processing network element performs encryption protection on the multicast service data by using the first sub-key, to obtain the ciphertext. In this case, the target data includes the ciphertext.

For another example, the multicast user-plane processing network element performs integrity protection on the multicast service data by using the second sub-key, to obtain the MAC. In this case, the target data includes the MAC.

In this way, the multicast user-plane processing network element can further derive the target MSK, and perform security protection by using the first derivation key.

S517. The multicast user-plane processing network element sends the target data to the terminal device. Correspondingly, the terminal device receives the target data from the multicast user-plane processing network element.

In an actual application process, the multicast user-plane processing network element sends the target data to the access network device. Correspondingly, the access network device receives the target data from the multicast user-plane processing network element. The access network device sends the target data to the terminal device. Correspondingly, the terminal device receives the target data from the access network device.

S518. The terminal device processes the target data by using the target key, to obtain a processing result of the target data.

For descriptions of the target key, refer to related descriptions of S510. Details are not described herein again.

For example, the target data includes an identifier of the target key (for example, the target MSK), and the terminal device obtains the target key through indexing based on the identifier of the target key in the target data. The terminal device processes the target data by using the target key (that is, the target key corresponding to the identifier of the target key) obtained through indexing. In other words, when the target data carries the identifier of the target key, the identifier of the target key in the target data can indicate a specific key used by the terminal device to process the target data, so that the terminal device can obtain, through indexing, the target key corresponding to the identifier of the target key in the target data.

If the target data includes the ciphertext but does not include the MAC, the terminal device performs "data decryption", to obtain the multicast service data (which may also be referred to as a plaintext). If the target data includes the multicast service data (which may also be referred to as a plaintext) and the MAC, the terminal device performs "integrity verification", to verify integrity of the multicast service data. If the target data includes the ciphertext and the MAC, the terminal device performs "data decryption" and "integrity verification", to verify integrity of the multicast service data corresponding to the ciphertext.

There is a plurality of specific implementations of S518, and the implementations may be, for example, but are not limited to, descriptions in the following four aspects:

First: In terms of a trigger condition for performing processing by the terminal device, the terminal device performs processing only when "the status indicated by the security protection status information is enabled". That is, a specific implementation of S518 is: If the status indicated by the security protection status information is enabled, the terminal device processes the target data by using the target key, to obtain the processing result of the target data. Alternatively, the terminal device performs processing, that is, S518, only when "the security protection status indicated by the target security policy is enabled". In other words, the terminal device processes the target data only when security protection between the terminal device and the multicast user-plane processing network element is enabled, to improve data processing efficiency.

Second: In terms of a security algorithm used by the terminal device to perform processing, the terminal device performs processing only when obtaining the "security algorithm". For example, when the terminal device obtains the security algorithm from the key generation network element or performs S515, S518 is specifically implemented as follows: The terminal device processes the target data by using the security algorithm and the target key, to obtain the processing result of the target data. Herein, when the security algorithm is implemented as the "encryption algorithm", the terminal device decrypts the target data by using the encryption algorithm and the target key, to obtain the plaintext. When the security algorithm is implemented as the "integrity protection algorithm", the terminal device verifies integrity of the multicast service data based on the integrity protection algorithm and the MAC. In other words, the terminal device processes the target data only when the terminal device has the security algorithm, to obtain the processing result of the target data.

Third: In terms of a processing type of processing performed by the terminal device, the processing type of processing performed by the terminal device includes two types: data decryption and integrity verification.

When the target data includes the ciphertext but does not include the MAC, the terminal device performs "data decryption", that is, the terminal device decrypts the ciphertext by using the target MSK or the first sub-key, to obtain first plaintext. The processing result of the target data includes the first plaintext. Herein, a specific implementation process of the decryption may be: inputting the target MSK (or the first sub-key) and the ciphertext into the encryption algorithm for processing, to obtain the first plaintext. For a specific implementation process, refer to a conventional technology. Details are not described herein.

When the target data includes second plaintext and the MAC, the terminal device performs "integrity verification", that is, the terminal device determines integrity of the second plaintext based on the MAC and at least one of the target MSK and the second sub-key. The processing result of the target data includes integrity of the second plaintext. Herein, a specific implementation process of the integrity verification may be: inputting the target MSK (or the second sub-key) and the second plaintext into the integrity protection algorithm, to obtain a MAC. The terminal device compares whether the received MAC is the same as the MAC calculated by the terminal device. If the MACs are the same, the verification succeeds. For a specific implementation process, refer to a conventional technology. Details are not described herein.

When the target data includes the ciphertext and the MAC, the terminal device performs "data decryption" and "integrity verification", that is, the terminal device decrypts the ciphertext by using the target MSK or the first sub-key, to obtain first plaintext. The terminal device determines integrity of the first plaintext based on the MAC and at least one of the target MSK and the second sub-key.

In this way, when the data is hidden, that is, the target data includes the ciphertext, the terminal device can decrypt the target data to obtain the plaintext. When the target data includes the MAC, the terminal device can perform "integrity verification" on the target data, to verify data integrity and avoid data tampering.

Figure 9:
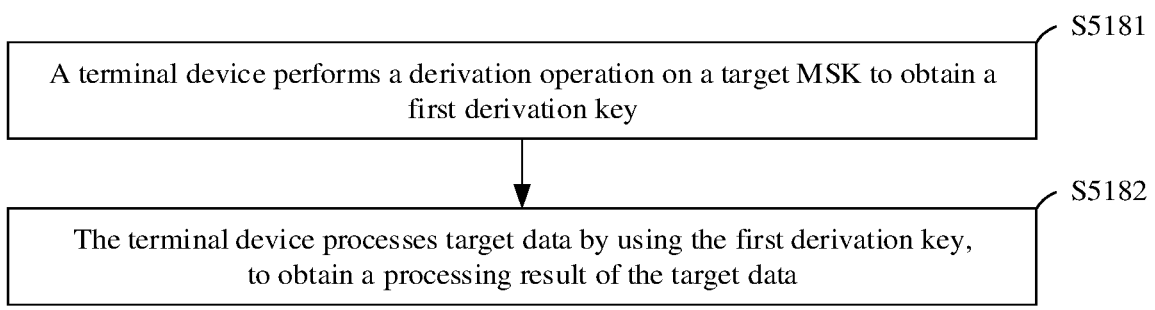
FIG. 9 is a schematic flowchart of another key management method according to an embodiment of the present disclosure.

Fourth: In terms of a key for performing processing, the key for performing processing may be the first derivation key determined based on the target MSK, for example, the first sub-key corresponding to the target MSK or the second sub-key corresponding to the target MSK. "Processing the target data by using the first derivation key" is used as an example. Refer to FIG. 9. S518 may be specifically implemented as S5181 and S5182.

S5181. The terminal device performs a derivation operation on the target MSK to obtain a first derivation key An algorithm of the derivation operation may be an HMAC algorithm. Herein, the first derivation key includes the first sub-key and the second sub-key. Herein, a specific implementation process of S5181 is consistent with that of S5161. To be specific, an execution body is the terminal device. Specifically, the following descriptions are provided by using Example 1 and Example 2:

Example 1: The Terminal Device Performs a First Derivation Operation on the Target MSK to Obtain the First Sub-Key The first derivation key includes the first sub-key, and the first sub-key is for confidentiality protection calculation and is denoted as MSK_enc. For example, the terminal device uses the target MSK as an input key, uses the encryption algorithm as an input parameter, and performs a derivation operation by using the HMAC algorithm, to obtain the first sub-key. For a specific implementation process, refer to a conventional technology. Details are not described herein.

In this way, the terminal device can obtain the first sub-key by using the target MSK in a derivation manner, to decrypt the target data.

Example 2: The Terminal Device Performs a Second Derivation Operation on the Target MSK to Obtain the Second Sub-Key The first derivation key includes the second sub-key, and the second sub-key is for integrity protection calculation and is denoted as MSK_int. For example, the terminal device uses the target MSK as an input key, uses the integrity protection algorithm as an input parameter, and performs a derivation operation by using the HMAC algorithm, to obtain the second sub-key. For a specific implementation process, refer to a conventional technology. Details are not described herein.

In this way, the terminal device can obtain the second sub-key by using the target MSK in a derivation manner, to perform integrity verification on the target data.

S5182. The terminal device processes the target data by using the first derivation key, to obtain the processing result of the target data.

For example, when the target data includes the ciphertext, the terminal device processes the target data by using the first sub-key, to obtain the ciphertext.

For another example, when the target data includes the MAC, the terminal device verifies integrity of the multicast service data based on the second sub-key and the MAC.

In this way, the terminal device can further derive the target MSK, and perform processing by using the first derivation key.

The foregoing is mainly related descriptions of "data transmission". In this phase, the multicast user-plane processing network element provides the target data on which security protection is performed for the terminal device, to achieve an effect of hiding data or reduce a possibility of data tampering.

Figure 5A:
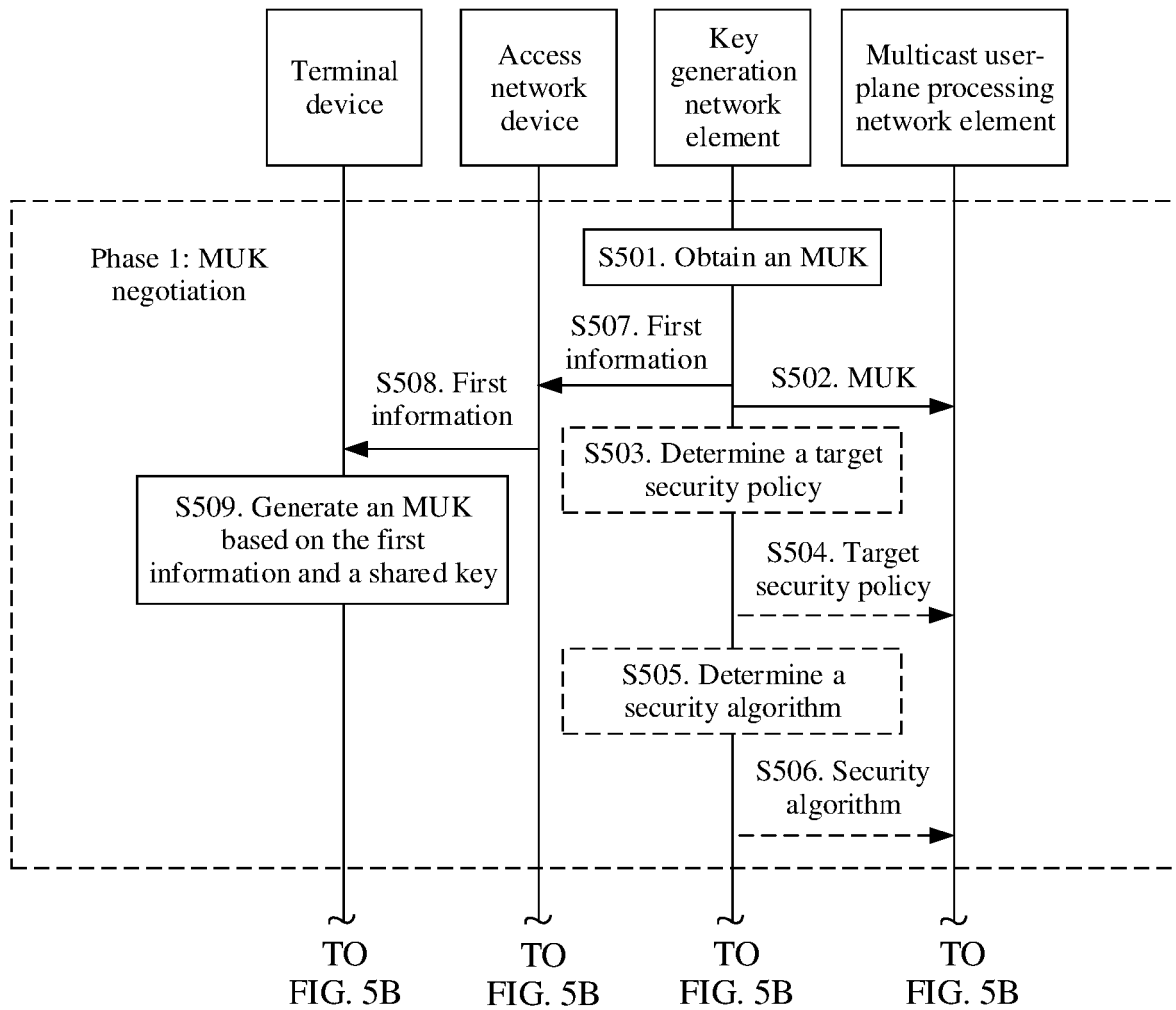
FIG. 5A and FIG. 5B are a schematic flowchart of a key management method according to an embodiment of the present disclosure.
Figure 5B:
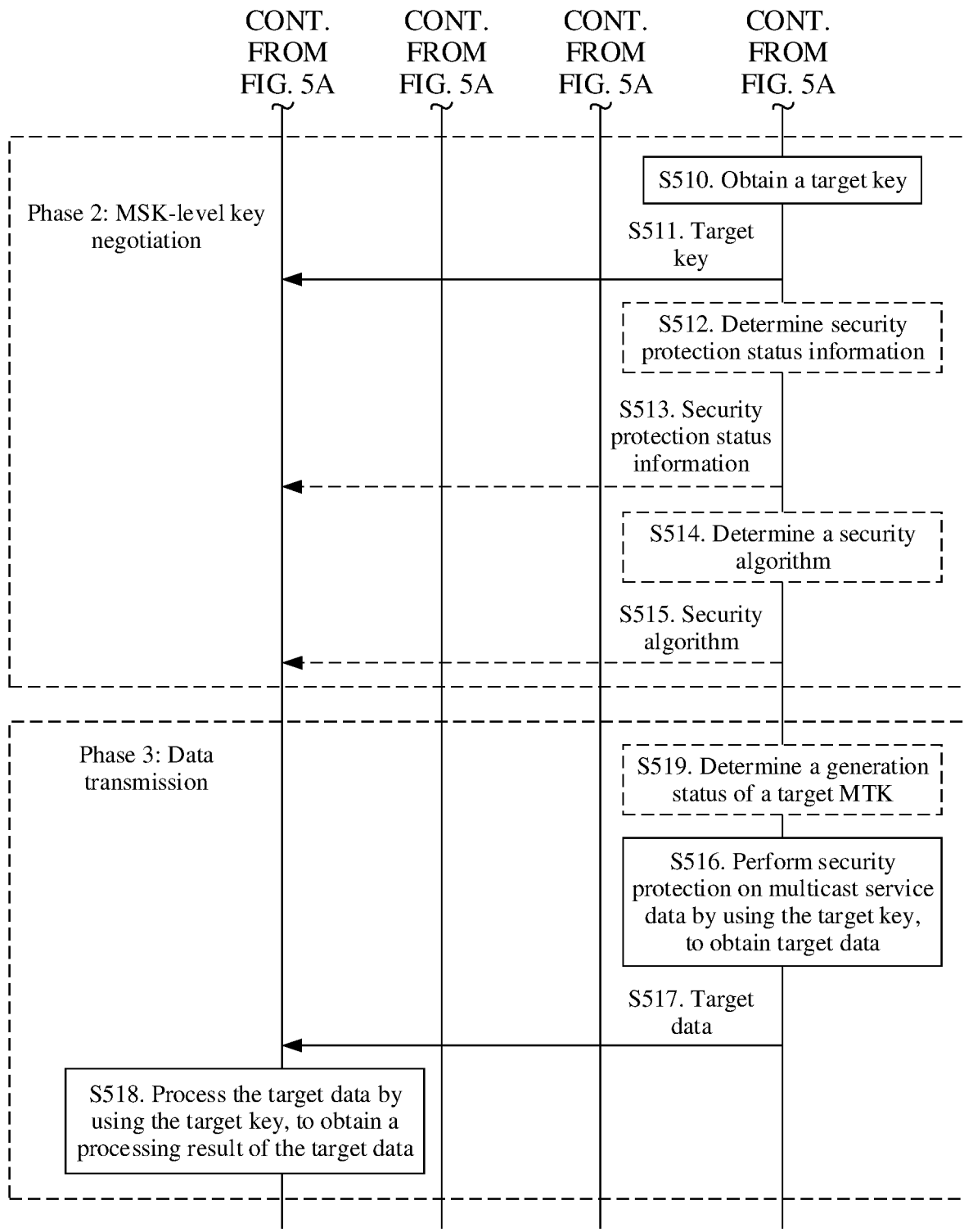

In some embodiments, the multicast user-plane processing network element can further determine a generation status of the target MTK, as shown in S519 in FIG. 5A and FIG. 5B.

S519. The multicast user-plane processing network element determines the generation status of the target MTK.

For example, the multicast user-plane processing network element receives a message from the terminal device. The message from the terminal device includes a session type or a transport protocol type. The multicast user-plane processing network element uses the session type or the transport protocol type as a determining basis. If the session type is a download type or a streaming type, the multicast user-plane processing network element determines to generate the target MTK. On the contrary, if the transport protocol type is not the download type or the streaming type, the multicast user-plane processing network element determines that the target MTK is not required. If the transport protocol type is the RTP, the FLUTE, or another protocol, the multicast user-plane processing network element determines to generate the target MTK. On the contrary, if the transport protocol type is not the RTP or the FLUTE, the multicast user-plane processing network element determines that the target MTK is not required.

For another example, the multicast user-plane processing network element receives a message from the SMF network element. The message from the SMF network element includes a transport protocol indication or a quality of service (QoS) parameter. Alternatively, the multicast user-plane processing network element receives a message from the AF network element. The message from the AF network element includes a transport protocol indication. If a transport protocol type in the transport protocol indication is the RTP, the FLUTE, or another protocol, the multicast user-plane processing network element determines to generate the target MTK. On the contrary, if the transport protocol type in the transport protocol indication is not the RTP or the FLUTE, the multicast user-plane processing network element determines that the target MTK is not required. If a traffic type parameter in the QoS parameter is a download type or a streaming type, the multicast user-plane processing network element determines to generate the target MTK. On the contrary, if the traffic type parameter in the QoS parameter is not the download type or the streaming type, the multicast user-plane processing network element determines that the target MTK does not need to be generated.

For another example, the multicast user-plane processing network element determines the generation status of the target MTK based on a network type. If the network type is an LTE network or a network before the LTE network, the multicast user-plane processing network element determines to generate the target MTK. If the network type is a 5G network or a network after the 5G network, the multicast user-plane processing network element determines that the target MTK does not need to be generated.

Herein, before performing the phase 3, the multicast user-plane processing network element may perform S519 to determine the generation status of the target MTK.

In other words, the multicast user-plane processing network element can independently determine whether to generate the target MTK. If the target MTK is not generated, the multicast user-plane processing network element performs "phase 3: data transmission", to perform security protection on the multicast service data by using the target key, to obtain the target data.

Figure 10:
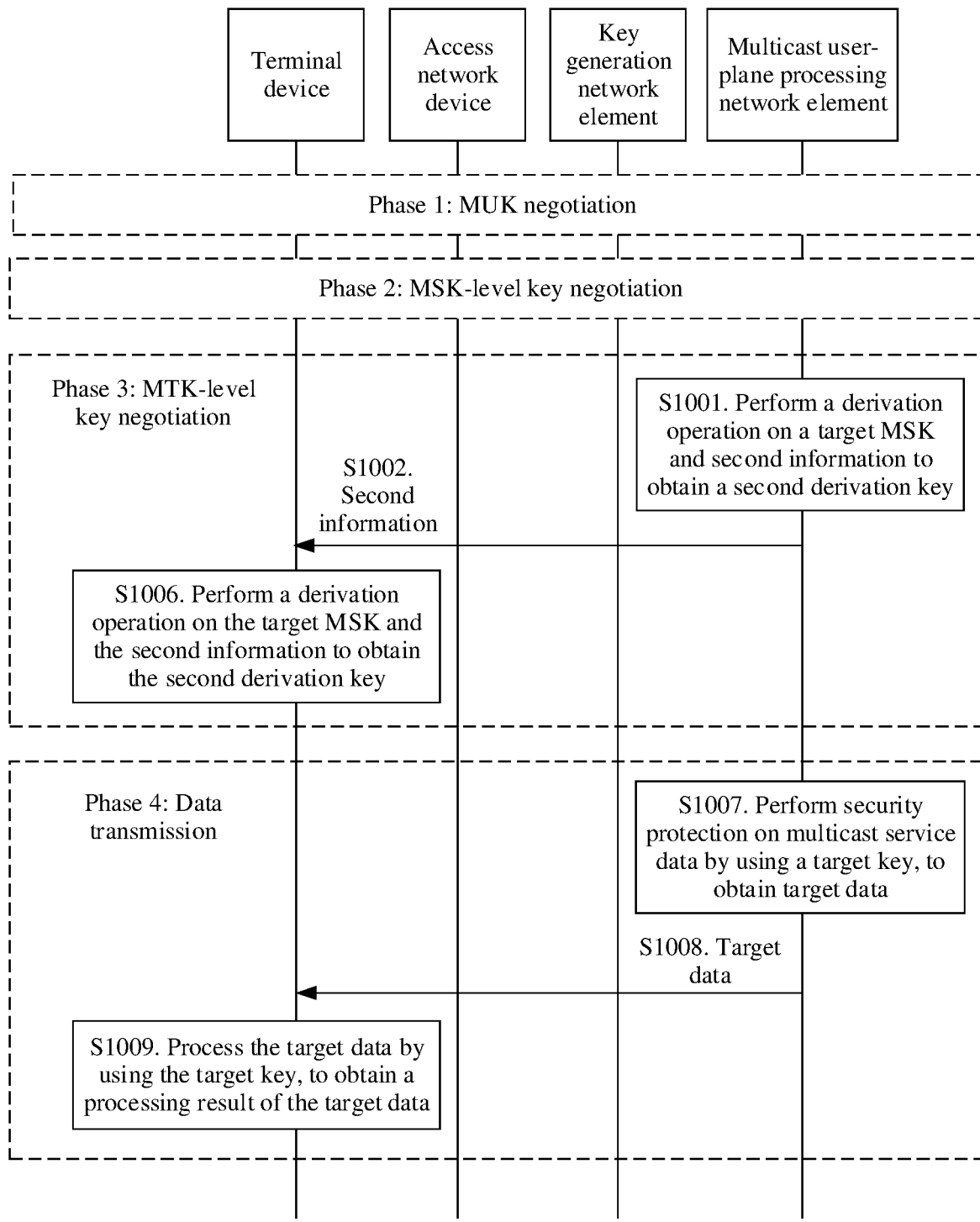
FIG. 10 is a schematic flowchart of another key management method according to an embodiment of the present disclosure.

The following describes a second key management method provided in embodiments of the present disclosure by using an example in which a target MTK is generated. The key management method is applied to an MBS communication process. A terminal device completes a registration process and a PDU session establishment process, and joins a multicast service. For details, refer to related descriptions of step 1 to step 5 in FIG. 3. Details are not described herein again. After joining the multicast service, the terminal device performs a key management method shown in FIG. 10. Specific steps are as follows:

For descriptions of the phase 1 and the phase 2, refer to related descriptions of the "first key management method". Details are not described herein again.

Phase 3: MTK-level key negotiation. In this phase, both a multicast user-plane processing network element and the terminal device obtain a target MTK or a sub-key corresponding to the target MTK. A specific process is shown in S1001 to S1006 in FIG. 10.

S1001. The multicast user-plane processing network element performs a derivation operation on the target MSK and second information to obtain a second derivation key.

The second information includes at least one of the following: a protocol name, an identifier of the target MTK, or a second parameter. Herein, the protocol name may be RTP or FULTE. The identifier of the target MTK may be generated and maintained by the multicast user-plane processing network element. The identifier of the target MTK may be counted from 1. The second parameter may be a parameter determined based on at least one of a second random number, a second count value, or a second timestamp. For example, the second parameter is the second random number, the second count value, or the second timestamp. The second parameter is generated and maintained by the multicast user-plane processing network element.

The second derivation key includes the target MTK, a third sub-key, or a fourth sub-key. For example, S1001 may be specifically implemented as the following Example 1 to Example 3:

Example 1: The multicast user-plane processing network element performs a third derivation operation on the target MSK and the second information to obtain the target MTK.

For example, the multicast user-plane processing network element uses the target MSK as an input key, uses the second information as an input parameter, and performs a second derivation operation by using an HMAC algorithm, to obtain the target MTK. For a specific implementation process, refer to a conventional technology. Details are not described herein.

In this way, the multicast user-plane processing network element may obtain the target MTK in a derivation manner by using the target MSK, to perform encryption protection or integrity protection on multicast service data.

Example 2: First, the multicast user-plane processing network element performs a third derivation operation on the target MSK and the second information, to obtain the target MTK, or the multicast user-plane processing network element locally generates the target MTK. Then, the multicast user-plane processing network element performs a fourth derivation operation on the target MTK to obtain the third sub-key. For example, the multicast user-plane processing network element uses the target MTK as an input key, uses an encryption algorithm as an input parameter, and performs a derivation operation by using an HMAC algorithm, to obtain the third sub-key. For a specific implementation process, refer to a conventional technology. Details are not described herein. The third sub-key is for confidentiality protection calculation.

In this way, the multicast user-plane processing network element can obtain the third sub-key in a derivation manner by using the target MSK, to perform encryption protection on multicast service data.

Example 3: First, the multicast user-plane processing network element performs a third derivation operation on the target MSK and the second information, to obtain the target MTK, or the multicast user-plane processing network element locally generates the target MTK. Then, the multicast user-plane processing network element performs a fifth derivation operation on the target MTK to obtain the fourth sub-key. For example, the multicast user-plane processing network element uses the target MTK as an input key, uses the integrity protection algorithm as an input parameter, and performs a derivation operation by using an HMAC algorithm, to obtain the fourth sub-key. For a specific implementation process, refer to a conventional technology. Details are not described herein. The fourth sub-key is for integrity protection calculation.

In this way, the multicast user-plane processing network element can obtain the fourth sub-key in a derivation manner by using the target MSK, to perform integrity protection on multicast service data.

S1002. The multicast user-plane processing network element sends the second information to the terminal device. Correspondingly, the terminal device receives the second information from the multicast user-plane processing network element.

For example, the multicast user-plane processing network element sends the second information to an access network device. Correspondingly, the access network device receives the second information from the multicast user-plane processing network element. The access network device sends the second information to the terminal device. Correspondingly, the terminal device receives the second information from the access network device. Herein, the second information may be carried in a multicast message.

Figure 11:
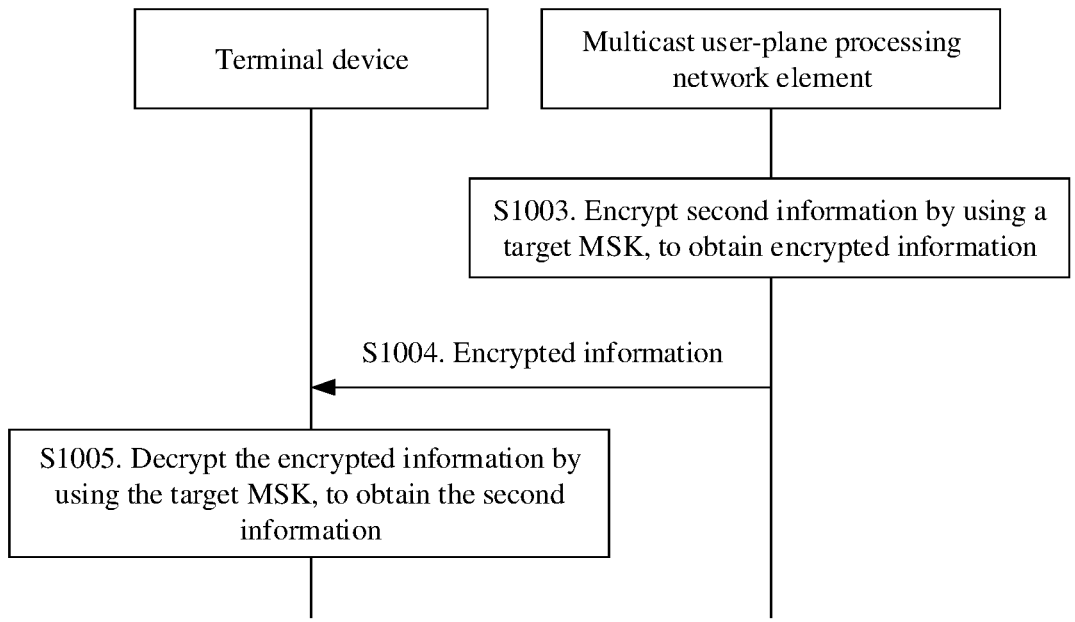
FIG. 11 is a schematic flowchart of another key management method according to an embodiment of the present disclosure.

Optionally, as shown in FIG. 11, S1002 may alternatively be replaced with S1003 to S1005.

S1003. The multicast user-plane processing network element encrypts the second information by using the target MSK, to obtain encrypted information.

For example, the encrypted information is carried in a multicast message. The multicast message includes two parts: a protected part and an unprotected part. The protected part is the encrypted information, the unprotected part includes an identifier of the target MSK, and the target MSK corresponding to the identifier is a key for encrypting the second information.

S1004. The multicast user-plane processing network element sends the encrypted information to the terminal device. Correspondingly, the terminal device receives the encrypted information from the multicast user-plane processing network element.

For example, the encrypted information is carried in a multicast message. The multicast message further includes the identifier of the target MSK. The target MSK corresponding to the identifier in the multicast message is a key for decrypting the second information.

For example, the multicast user-plane processing network element sends the encrypted information to the terminal device through the access network device. Correspondingly, the terminal device receives the encrypted information from the multicast user-plane processing network element through the access network device.

S1005. The terminal device decrypts the encrypted information by using the target MSK, to obtain the second information.

For example, when the multicast message further includes the identifier of the target MSK, the terminal device obtains the target MSK through indexing based on the identifier of the target key in the multicast message, and decrypts the encrypted information by using the target MSK (that is, the target MSK corresponding to the identifier of the target MSK) obtained through indexing, to obtain the second information.

Herein, although the second information is distributed by using a multicast message, because the target MSK is transmitted by using a unicast message, the target MSK protects a distribution process of the second information, and the second information is for derivation of the target MTK. In this way, security of the target MTK derived based on the second information is equivalent to security of unicast message transmission.

It should be noted that the target MTK may alternatively be a random number locally generated by the multicast user-plane processing network element or in another form. When the target MTK is a random number, the multicast user-plane processing network element sends a multicast message to the terminal device. Correspondingly, the terminal device receives the multicast message from the multicast user-plane processing network element. The multicast message also includes a protected part and an unprotected part. The protected part is a part obtained by encrypting the target MTK and the identifier of the target MTK by using the target MSK, and the unprotected part includes the identifier of the target MSK. In addition, when the "MTK-level key negotiation" phase is performed, at least one of "security protection status information" and a "security algorithm" may be transmitted in the "MSK-level key negotiation" phase, or may be transmitted in the "MTK-level key negotiation" phase. For example, at least one of the "security protection status information" and the "security algorithm" is carried in a multicast message. This is not limited in embodiments of the present disclosure.

S1006. The terminal device performs a derivation operation on the target MSK and the second information to obtain the second derivation key.

For related descriptions of the second information, refer to related descriptions of S1001. Details are not described herein again.

The second derivation key includes the target MTK, the third sub-key, or the fourth sub-key. A specific implementation process of S1006 is consistent with a process of S1001. To be specific, an execution body is the terminal device. Specifically, the following descriptions are provided by using Example 1 to Example 3:

Example 1: The terminal device performs a third derivation operation on the target MSK and the second information to obtain the target MTK.

For example, the terminal device uses the target MSK as an input key, uses the second information as an input parameter, and performs a second derivation operation by using an HMAC algorithm, to obtain the target MTK. For a specific implementation process, refer to a conventional technology. Details are not described herein.

In this way, the terminal device can obtain the target MTK by using the target MSK in a derivation manner, to perform decryption or integrity verification on target data.

Example 2: First, the terminal device performs a third derivation operation on the target MSK and the second information, to obtain the target MTK, or the terminal device locally generates the target MTK. Then, the terminal device performs a fourth derivation operation on the target MTK to obtain the third sub-key. For example, the terminal device uses the target MTK as an input key, uses the encryption algorithm as an input parameter, and performs a derivation operation by using the HMAC algorithm, to obtain the third sub-key. For a specific implementation process, refer to a conventional technology. Details are not described herein.

In this way, the terminal device can obtain the third sub-key by using the target MSK in a derivation manner, to decrypt target data.

Example 3: First, the terminal device performs a third derivation operation on the target MSK and the second information, to obtain the target MTK, or the terminal device locally generates the target MTK. Then, the terminal device performs a fifth derivation operation on the target MTK to obtain the fourth sub-key. For example, the terminal device uses the target MTK as an input key, uses the integrity protection algorithm as an input parameter, and performs a derivation operation by using the HMAC algorithm, to obtain the fourth sub-key. For a specific implementation process, refer to a conventional technology. Details are not described herein. The fourth sub-key is for integrity protection calculation.

In this way, the terminal device can obtain the fourth sub-key by using the target MSK in a derivation manner, to perform integrity protection on the target data.

The foregoing is mainly related descriptions of "MTK-level key negotiation". In this phase, the multicast user-plane processing network element can obtain an MTK-level key, for example, the target MTK, the third sub-key, or the fourth sub-key. Then, the multicast user-plane processing network element can further provide the second information for the terminal device, so that the terminal device determines the MTK-level key. In this way, both the multicast user-plane processing network element and the terminal device obtain the MTK-level key.

Phase 4: Data transmission. In this phase, the multicast user-plane processing network element provides the target data for the terminal device. For a specific implementation process, refer to related descriptions of S1007 to S1009.

S1007. The multicast user-plane processing network element performs security protection on multicast service data by using a target key, to obtain the target data.

Herein, a "security protection trigger condition", a "security algorithm corresponding to security protection", and a "security protection type" are consistent with those in S516. From a perspective of the key for performing security protection, the target key for performing security protection is implemented as the second derivation key, for example, the target MTK, the third sub-key, or the fourth sub-key. For descriptions of the "target MTK, the third sub-key, or the fourth sub-key", refer to related descriptions of S1001. Details are not described herein again.

S1008. The multicast user-plane processing network element sends the target data to the terminal device. Correspondingly, the terminal device receives the target data from the multicast user-plane processing network element.

For a specific implementation process of S1008, refer to descriptions of S517. Details are not described herein again.

S1009. The terminal device processes the target data by using the target key, to obtain a processing result of the target data.

Herein, a "trigger condition for performing processing by the terminal device", a "security algorithm used by the terminal device to perform processing", and a "processing type of processing performed by the terminal device" are consistent with those in S518. From a perspective of the key for performing processing, the target key for performing security protection is implemented as the second derivation key, for example, the target MTK, the third sub-key, or the fourth sub-key. For descriptions of the "target MTK, the third sub-key, or the fourth sub-key", refer to related descriptions of S1006. Details are not described herein again.

For example, the target data further includes the identifier of the target MTK. The terminal device obtains the target MTK through indexing based on the identifier in the target data, and the terminal device processes the target data by using the target MTK (the target MTK corresponding to the identifier of the target MTK) obtained through indexing.

The foregoing is mainly related descriptions of "data transmission". In this phase, the multicast user-plane processing network element provides the target data on which security protection is performed for the terminal device, to achieve an effect of hiding data or reduce a possibility of data tampering.

An embodiment of the present disclosure provides a third key management method, and the key management method is applied to an MBS communication process. A terminal device completes a registration process and a PDU session establishment process, and joins a multicast service. For details, refer to related descriptions of step 1 to step 5 in FIG. 3. Details are not described herein again. After joining the multicast service, the terminal device performs a key management method shown in FIG. 12. Specific steps are as follows:

Phase 1: MSK-level key negotiation. In this phase, both the terminal device and a multicast user-plane processing network element obtain a target key, for example, a target MSK, a first sub-key, or a second sub-key. For a specific implementation process, refer to related descriptions of S1201 to S1204.

S1201. A key generation network element obtains the target key.

For example, the key generation network element initiates a processing process of "obtaining the target key" only when a specific trigger condition is met. Herein, the key generation network element determines, based on a multicast service authentication or authorization result, whether to initiate the processing process of "obtaining the target key". It may be understood that, when multicast service authentication of the key generation network element succeeds or the terminal device is authorized, the key generation network element initiates the processing procedure of "obtaining the target key". On the contrary, when the multicast service authentication of the key generation network element fails or the terminal device is not authorized, the key generation network element does not initiate the processing process of "obtaining the target key". For descriptions of "multicast service authentication" and "authorization", refer to related descriptions of S501. Details are not described herein again.

For example, a specific implementation process of "obtaining the target key by the key generation network element" may be, for example, but is not limited to the following:

The key generation network element performs multicast transmission session check for a UDM network element based on an identifier of the multicast service, that is, checks whether a multicast context (such as QoS information or the target key) corresponding to the identifier of the multicast service exists. For example, the key generation network element is implemented as an SMF network element. The SMF network element sends the identifier of the multicast service (for example, an IP address of the multicast service) to the UDM network element. Correspondingly, the UDM network element receives the identifier of the multicast service from the SMF network element. Then, the UDM network element checks whether the multicast context corresponding to the identifier of the multicast service exists.

If the UDM network element determines that the multicast context corresponding to the identifier of the multicast service exists, the UDM network element sends the multicast context corresponding to the identifier of the multicast service to the SMF network element. Correspondingly, the SMF network element receives, from the UDM network element, the multicast context corresponding to the identifier of the multicast service. The multicast context corresponding to the identifier of the multicast service includes the target key.

If the UDM network element determines that the multicast context corresponding to the identifier of the multicast service does not exist, the SMF network element may obtain the target key in the following two manners. Details are as follows:

Manner 1: The SMF network element generates the target key. For example, the SMF network element generates the target MSK by using a random number. For a specific implementation process, refer to a conventional technology. Details are not described herein. Optionally, after the SMF network element generates the target MSK, the SMF network element performs a first derivation operation on the target MSK, to obtain the first sub-key. For example, the SMF network element uses the target MSK as an input key, uses an encryption algorithm as an input parameter, and performs a derivation operation by using an HMAC algorithm, to obtain the first sub-key. Alternatively, the SMF network element performs a second derivation operation on the target MSK to obtain the second sub-key. For example, the SMF network element uses the target MSK as an input key, uses an integrity protection algorithm as an input parameter, and performs a derivation operation by using an HMAC algorithm, to obtain the second sub-key.

Manner 2: An AUSF network element generates the target key. The SMF network element sends a key request message to the AUSF network element. Correspondingly, the AUSF network element receives the key request message from the SMF network element. The key request message is for requesting the target key. After receiving the key request message, the AUSF network element sends the target key to the SMF network element. In this way, the SMF network element can obtain the target key. Herein, if the AUSF network element cannot generate the target key, the AUSF network element sends a failure message to the SMF network element. Correspondingly, the SMF network element receives the failure message from the AUSF network element. The failure message includes a failure cause value. The failure cause value includes at least one of the following: Kausf stored in the AUSF network element is unavailable, or a derivation parameter stored in the AUSF network element is unavailable.

It should be noted that when the UDM network element determines that the multicast context corresponding to the identifier of the multicast service does not exist, after the SMF network element obtains the target key, the SMF network element sends the target key and the identifier of the multicast service to the UDM network element. Correspondingly, the UDM network element receives and stores the target key and the identifier of the multicast service from the SMF network element.

S1202. The key generation network element sends the target key to the multicast user-plane processing network element.

For example, the target key is carried in a key notification message. After the multicast user-plane processing network element receives the key notification message from the key generation network element, the multicast user-plane processing network element sends a response message to the key generation network element. Correspondingly, the key generation network element receives the response message from the multicast user-plane processing network element. The response message indicates that the multicast user-plane processing network element has received the target key.

In some embodiments, the key generation network element sends time information corresponding to the target MSK to the multicast user-plane processing network element. Correspondingly, the multicast user-plane processing network element receives the time information corresponding to the target MSK from the key generation network element. The time information corresponding to the target MSK indicates valid time of the target MSK. In other words, within the valid time of the target MSK, the multicast user-plane processing network element protects distribution of second information (information for generating a target MTK) by using the target MSK. In this way, the terminal device can obtain the second information to generate the target MTK. On the contrary, the second information is not distributed beyond the valid time of the target MSK. In this case, the terminal device cannot obtain the second information, and therefore cannot generate the target MTK. Alternatively, within valid time of the target MSK, the multicast user-plane processing network element protects distribution of the multicast service data by using the target MSK. In this way, the terminal device can obtain the multicast service data. On the contrary, the target MSK does not exist beyond the valid time of the target MSK, and the multicast service data is no longer distributed. In this case, the terminal device cannot obtain the multicast service data.

Therefore, when the key generation network element provides the target MSK for the multicast user-plane processing network element, the key generation network element can further indicate the valid time of the target MSK, to meet use requirements of the multicast user-plane processing network element in different time periods.

In some embodiments, the key generation network element can further determine a target security policy, and provide the target security policy for the multicast user-plane processing network element. For details, refer to descriptions of S503 and S504. Details are not described herein again. Alternatively, the key generation network element can further provide a security algorithm for the multicast user-plane processing network element. For details, refer to descriptions of S505 and S506. Details are not described herein again.

In some embodiments, the key generation network element can further provide the identifier of the target MSK for the multicast user-plane processing network element. This embodiment of the present disclosure provides two possible implementations. The following related descriptions of implementation 1 and implementation 2 are specifically provided.

Implementation 1: The key generation network element sends the identifier of the target MSK to the multicast user-plane processing network element. Correspondingly, the multicast user-plane processing network element receives the identifier of the target MSK from the key generation network element.

For example, the identifier of the target MSK includes two parts: an "ID of the multicast service" and a "key number part". To be specific, when the identifier of the target MSK is implemented as "ID of the multicast service+key number part", "ID of the multicast service+key number part" is transmitted from the key generation network element to the multicast user-plane processing network element. Herein, for descriptions of the "ID of the multicast service", refer to related descriptions of S5011. Details are not described herein again.

Implementation 2: First, the key generation network element sends a key number part to the multicast user-plane processing network element. Correspondingly, the multicast user-plane processing network element receives the key number part from the key generation network element. Then, the multicast user-plane processing network element determines the identifier of the target MSK based on the key number part and an ID of the multicast service.

That the identifier of the target MSK is implemented as "ID of the multicast service+key number part" is still used as an example. The key number part is transmitted from the key generation network element to the multicast user-plane processing network element. The multicast user-plane processing network element may restore the identifier of the target MSK based on the obtained "ID of the multicast service" and the obtained key number part.

In this way, when the key generation network element provides the key number part for the multicast user-plane processing network element, the multicast user-plane processing network element can also determine the identifier of the target MSK. Compared with transmitting the "identifier of the target MSK", this reduces transmission resource overheads.

In some embodiments, the key generation network element can further provide the target key for the terminal device. In other words, the terminal device obtains the target key by using a control plane message. For details, refer to related descriptions of S1203 to S1204.

S1203. The key generation network element sends the target key to an access network device. Correspondingly, the access network device receives the target key from the key generation network element.

For example, when the key generation network element is implemented as an SMF network element, the SMF network element sends the target key to an AMF network element. Correspondingly, the AMF network element receives the target key from the SMF network element. The AMF network element sends the target key to the access network device. Correspondingly, the access network device receives the target key from the AMF network element.

For another example, when the key generation network element is implemented as an AMF network element, the AMF network element sends the target key to the access network device. Correspondingly, the access network device receives the target key from the AMF network element.

For another example, when the key generation network element is implemented as an AUSF network element, the AUSF network element sends the target key to an SMF network element. Correspondingly, the SMF network element receives the target key from the AUSF network element. The SMF network element sends the target key to the AMF network element. Correspondingly, the AMF network element receives the target key from the SMF network element. The AMF network element sends the target key to the access network device. Correspondingly, the access network device receives the target key from the AMF network element.

S1204. The access network device sends the target key to the terminal device. Correspondingly, the terminal device receives the target key from the access network device.

In some embodiments, the key generation network element can further provide at least one of the target security policy and the security algorithm for the terminal device. For details, refer to related descriptions of S512 to S515. Details are not described herein again.

In some embodiments, the key generation network element can further provide the identifier of the target MSK for the terminal device. This embodiment of the present disclosure still provides two possible implementations, which are specifically described in the following Example 1 and Example 2:

Example 1: The key generation network element sends the identifier of the target MSK to the terminal device. Correspondingly, the terminal device receives the identifier of the target MSK from the key generation network element.

Example 2: First, the key generation network element sends a key number part to the terminal device. Correspondingly, the terminal device receives the key number part from the key generation network element. Then, the terminal device determines the identifier of the target MSK based on the key number part and the ID of the multicast service.

In this way, when the key generation network element provides the key number part for the terminal device, the terminal device can also determine the identifier of the target MSK. Compared with transmitting the "identifier of the target MSK", this reduces transmission resource overheads.

It should be noted that, the terminal device may alternatively receive at least one of the target key, security protection status information, a security algorithm, and an identifier of the target key from the multicast user-plane processing network element. For details, refer to descriptions of "phase 1" and "phase 2" in the "first key management method".

The foregoing is mainly related descriptions of "MSK-level key negotiation". In this phase, both the terminal device and the multicast user-plane processing network element obtain the target key. Certainly, it is easy to understand that "phase 1: MSK-level key negotiation" shown in FIG. 12 may also be replaced with "phase 2: MSK-level key negotiation" shown in FIG. 5A and FIG. 5B. For a specific implementation process, refer to related descriptions of S510 to S515 in FIG. 5A and FIG. 5B. Details are not described herein.

Figure 12:
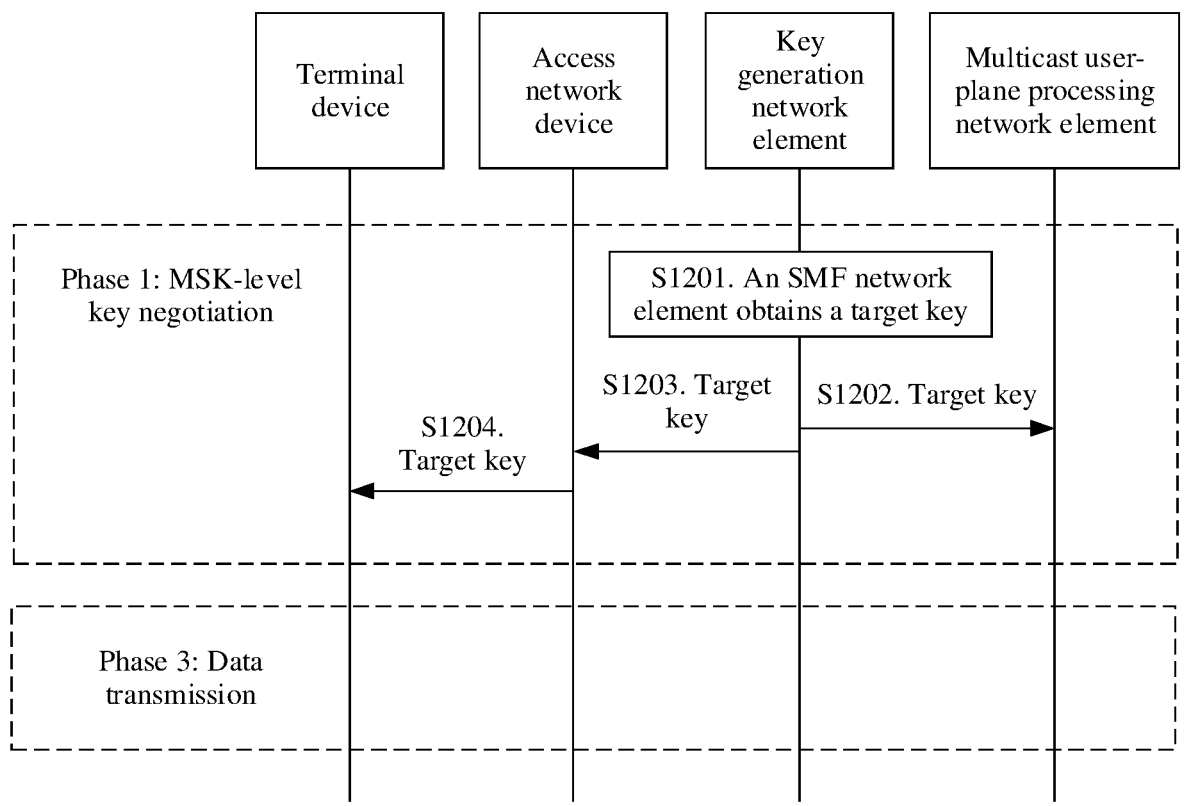
FIG. 12 is a schematic flowchart of another key management method according to an embodiment of the present disclosure.

After obtaining the target key, the multicast user-plane processing network element performs "phase 3: data transmission" in the "first key management method" when the target MTK does not need to be generated, as shown in FIG. 12. When the target MTK is generated, "phase 3: MTK-level key negotiation" and "phase 4: data transmission" in the "first key management method" are performed, which are not shown in FIG. 12.

It should be noted that, in the key management method provided in embodiments of the present disclosure, names such as "MUK, MSK, and MTK" are only used as examples to describe a key management processing procedure, and do not constitute a limitation on the technical solutions provided in embodiments of the present disclosure. A person of ordinary skill in the art may learn that, with evolution of a network architecture and emergence of a new service scenario, at least one of an MUK, an MSK, and an MTK is defined as another name. The technical solutions provided in embodiments of the present disclosure are also applicable to similar technical problems.

In addition, an "execution occasion of S503 to S506" is further described. S503 to S506 may be performed in the "MUK negotiation" phase, specifically, as shown in FIG. 5A and FIG. 5B. Alternatively, S503 to S506 may be performed in the "MSK-level key negotiation" phase (both the phase 2 shown in FIG. 5A and FIG. 5B and the phase 1 shown in FIG. 12), or S503 to S506 may be performed in the "MTK-level key negotiation" phase (the phase 3 shown in FIG. 10). That is, S503 to S506 are performed before the "data transmission" phase. If S503 to S506 are performed in the "MUK negotiation" or "MSK-level key negotiation" phase, S512 to S515 may be performed in the "MSK-level key negotiation" phase (as shown in FIG. 5A and FIG. 5B), or S512 to S515 may be performed in the "MTK-level key negotiation" phase (not shown in FIG. 10). If S503 to S506 are performed in the "MTK-level key negotiation" phase, S512 to S515 are performed in the "MTK-level key negotiation" phase (not shown in FIG. 10).

The foregoing mainly describes the solutions provided in embodiments of the present disclosure from a perspective of interaction between network elements. Correspondingly, embodiments of the present disclosure further provide a communication apparatus. The communication apparatus may be the network element in the foregoing method embodiments, or an apparatus including the foregoing network element, or a component that can be used in the network element. It may be understood that, to implement the foregoing functions, the communication apparatus includes a hardware structure and/or a software module for performing a corresponding function. A person skilled in the art should easily be aware that, in combination with units and algorithm steps of the examples described in embodiments disclosed in this specification, the present disclosure may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present disclosure.

Figure 13:
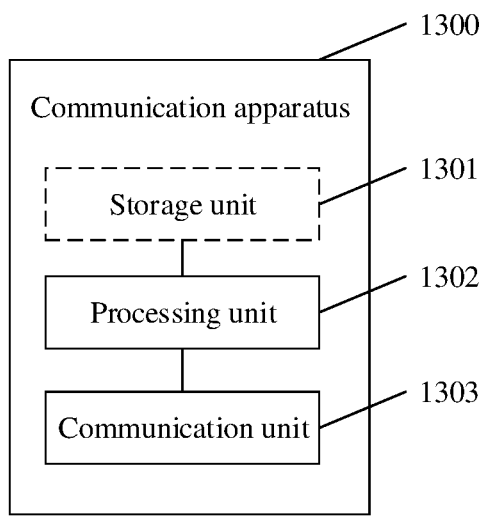
FIG. 13 is a schematic diagram of a structure of a communication apparatus according to an embodiment of the present disclosure.

FIG. 13 is a schematic diagram of a structure of a communication apparatus 1300. The communication apparatus 1300 includes a communication unit 1303 and a processing unit 1302.

For example, the communication apparatus 1300 is the terminal device in FIG. 5A and FIG. 5B, FIG. 10, or FIG. 12 in the foregoing method embodiments. In this case, the processing unit 1302 is configured to obtain a target key. The target key includes at least one of a target MSK, a first sub-key corresponding to the target MSK, or a second sub-key corresponding to the target MSK. The first sub-key is for confidentiality protection calculation, and the second sub-key is for integrity protection calculation. The communication unit 1303 is configured to receive target data from a multicast user-plane processing network element. The target data is data on which security protection is performed. The processing unit 1302 is further configured to process the target data by using the target key. Herein, the multicast user-plane processing network element is one of the following network elements: an MBSU network element, a UPF network element, a UPGW, or an MSF network element.

In a possible design, the communication unit 1303 is further configured to receive a security algorithm from a first network element. The security algorithm includes at least one of an encryption algorithm and an integrity protection algorithm. The processing unit 1302 is specifically configured to process the target data by using the security algorithm and the target key. Herein, the first network element is the multicast user-plane processing network element or a key generation network element. The key generation network element is an AMF network element, an SMF network element, or an AUSF network element.

In a possible design, the communication unit 1303 is further configured to receive security protection status information from the first network element. The security protection status information indicates a security protection status, and the security protection includes at least one of data encryption and integrity verification. The processing unit 1302 is specifically configured to process the target data by using the target key if the status indicated by the security protection status information is enabled. Herein, the first network element is the multicast user-plane processing network element or a key generation network element.

In a possible design, the communication unit 1303 is further configured to receive the target key from the first network element. The processing unit 1302 is specifically configured to obtain the target key through the communication unit 1303.

In a possible design, the processing unit 1302 is further configured to obtain an identifier of the target key. The processing unit 1302 is specifically configured to obtain the target key corresponding to the identifier of the target key.

In a possible design, the communication unit 1303 is further configured to receive the identifier of the target data from the first network element. The processing unit 1302 is specifically configured to obtain the identifier of the target key through the communication unit 1303. Alternatively, the communication unit 1303 is further configured to receive a key number part from the first network element. The processing unit 1302 is specifically configured to determine the identifier of the target key based on the key number part and an identifier (ID) of a multicast service.

In a possible design, the communication unit 1303 is further configured to receive first information from the key generation network element. The first information includes at least one of the following: an identifier of the multicast user-plane processing network element, a first parameter, or the ID of the multicast service. Herein, the first parameter is a parameter determined based on at least one of a first sequence number and a first timestamp. The processing unit 1302 is further configured to generate an MUK based on the first information and a shared key. The shared key is a key shared between the communication apparatus 1300 and a core network device. The communication unit 1303 is further configured to receive key information from the multicast user-plane processing network element. The key information is information obtained after the target key is encrypted by using the MUK. The processing unit 1302 is specifically configured to decrypt the key information by using the MUK, to obtain the target key.

In a possible design, the processing unit 1302 is specifically configured to perform a derivation operation on the target MSK to obtain a derivation key, and perform decryption or integrity verification on the target data by using the derivation key.

In a possible design, the processing unit 1302 is specifically configured to perform a derivation operation on the target MSK and second information to obtain a derivation key, where the second information includes at least one of the following: a protocol name, an identifier of a target MTK, or a second parameter. Herein, the second parameter is a parameter determined based on at least one of a second sequence number and a second timestamp.

For example, the communication apparatus 1300 is the multicast user-plane processing network element in FIG. 5A and FIG. 5B, FIG. 10, or FIG. 12 in the foregoing method embodiments. The processing unit 1302 is configured to obtain a target key. The target key includes at least one of a target MSK, a first sub-key corresponding to the target MSK, or a second sub-key corresponding to the target MSK. The first sub-key is for confidentiality protection calculation, and the second sub-key is for integrity protection calculation. The processing unit 1302 is further configured to perform security protection on multicast service data by using the target key, to obtain the target data. The communication unit 1303 is configured to send target data to a terminal device.

In a possible design, the processing unit 1302 is specifically configured to generate the target key. Alternatively, the communication unit 1303 is further configured to receive the target key from a key generation network element. The processing unit 1302 is specifically configured to obtain the target key through the communication unit 1303.

In a possible design, the communication unit 1303 is further configured to send the target key to the terminal device.

In a possible design, the communication unit 1303 is further configured to receive an MUK from the key generation network element. The processing unit 1302 is further configured to encrypt the target key by using the MUK, to obtain key information. The communication unit 1303 is further configured to send the key information to the terminal device.

In a possible design, the communication unit 1303 is further configured to send an identifier of the target MSK to the terminal device. Alternatively, the communication unit 1303 is further configured to send a key number part to the terminal device. There is a mapping relationship between the key number part and the identifier of the target MSK.

In a possible design, the processing unit 1302 is further configured to obtain a security algorithm. The security algorithm includes at least one of an encryption algorithm and an integrity protection algorithm. The processing unit 1302 is specifically configured to perform security protection on multicast service data by using the security algorithm and the target key, to obtain the target data.

In a possible design, the processing unit 1302 is further configured to determine security protection status information. The security protection status information indicates a security protection status, and the security protection includes at least one of data encryption and integrity verification. The processing unit 1302 is specifically configured to: if the status indicated by the security protection status information is enabled, perform security protection on the multicast service data by using the target key, to obtain the target data.

In a possible design, the processing unit 1302 is specifically configured to perform a derivation operation on the target MSK to obtain a derivation key, and perform security protection on the multicast service data by using the derivation key, to obtain the target data.

In a possible design, the processing unit 1302 is specifically configured to perform a derivation operation on the target MSK and second information to obtain a derivation key. The second information includes at least one of the following: a protocol name, an identifier of a target MTK, or a second parameter. Herein, the second parameter is a parameter determined based on at least one of a second sequence number and a second timestamp.

In a possible design, the processing unit 1302 is further configured to determine, based on at least one of a transport protocol type, a session type, a quality of service QoS parameter, or a network type, to generate the target MTK. The derivation key includes the target MTK.

For example, the communication apparatus 1300 is the key generation network element in FIG. 5A and FIG. 5B in the foregoing method embodiment. The processing unit 1302 is configured to obtain an MUK. The communication unit 1303 is configured to send the MUK to a multicast user-plane processing network element.

In a possible design, the processing unit 1302 is further configured to obtain first information. The first information includes at least one of the following: an identifier of the multicast user-plane processing network element, a first parameter, or an identifier (ID) of a multicast service. Herein, the first parameter is a parameter determined based on at least one of a first sequence number and a first timestamp. The processing unit 1302 is specifically configured to generate the MUK based on the first information and a shared key. The shared key is a key shared between a terminal device and a core network device.

In a possible design, the communication unit 1303 is further configured to send the first information to the terminal device.

In a possible design, the processing unit 1302 is further configured to determine a target security policy. The target security policy includes at least one of a confidentiality protection policy and an integrity protection policy. The communication unit 1303 is further configured to send the target security policy to the multicast user-plane processing network element.

In a possible design, the processing unit 1302 is specifically configured to determine the target security policy based on a transmission status of a target MTK and a basic policy. The basic policy includes a multicast security policy in a multicast context or a user plane security policy in UDM subscription data.

In a possible design, the processing unit 1302 is further configured to determine a security algorithm. The security algorithm is for security protection calculation, and the security protection is indicated by the target security policy. The communication unit 1303 is further configured to send the security algorithm to the multicast user-plane processing network element.

In a possible design, the communication unit 1303 is further configured to send at least one of the target security policy and the security algorithm to the terminal device. The security algorithm is for security protection calculation, and the security protection is indicated by the target security policy.

For example, the communication apparatus 1300 is the key generation network element in FIG. 12 in the foregoing method embodiment. The processing unit 1302 is configured to obtain a target key. The target key includes at least one of a target MSK, a first sub-key corresponding to the target MSK, or a second sub-key corresponding to the target MSK, the first sub-key is for confidentiality protection calculation, and the second sub-key is for integrity protection calculation. The communication unit 1303 is further configured to send the target key to a multicast user-plane processing network element.

In a possible design, the communication unit 1303 is further configured to send an identifier of the target key to the multicast user-plane processing network element. Alternatively, the communication unit 1303 is further configured to send a key number part to the multicast user-plane processing network element. There is a mapping relationship between the key number part and the identifier of the target key.

In a possible design, the communication unit 1303 is further configured to send at least one of the key number part, the target key, and the identifier of the target key to a terminal device. There is a mapping relationship between the key number part and the identifier of the target key.

For example, the communication apparatus 1300 is the AUSF network element in FIG. 5A and FIG. 5B in the foregoing method embodiment. The communication unit 1303 is configured to receive first information and a SUPI of a terminal device from a key generation network element. The first information includes at least one of the following: an identifier of a multicast user-plane processing network element, a first parameter, or an identifier (ID) of a multicast service. Herein, the first parameter is a parameter determined based on at least one of a first sequence number and a first timestamp. The processing unit 1302 is configured to generate an MUK based on the first information and the SUPI. The communication unit 1303 is further configured to send the MUK to the key generation network element.

In a possible design, the processing unit 1302 is specifically configured to: determine a shared key based on the SUPI, where the shared key is a key shared between the terminal device and a core network device; and generate the MUK based on the shared key and the first information.

All related content of the steps in the foregoing method embodiments may be cited in function descriptions of the corresponding functional modules. Details are not described herein again.

Optionally, the communication apparatus 1300 further includes a storage unit 1301, configured to store program code and data of the communication apparatus 1300, where the data may include but is not limited to original data, intermediate data, or the like.

The processing unit 1302 may be a processor or a controller, for example, may be a central processing unit (CPU), a general purpose processor, a digital signal processor (DSP), an application-specific integrated circuit (ASIC), a field programmable gate array (FPGA) or another programmable logic device, a transistor logic device, a hardware component, or any combination thereof. The processor may implement or execute various example logical blocks, modules, and circuits described with reference to content disclosed in the present disclosure. Alternatively, the processor may be a combination of processors implementing a computing function, for example, a combination of one or more microprocessors, or a combination of the DSP and a microprocessor.

The communication unit 1303 may be a communication interface, a transceiver, a transceiver circuit, or the like. The communication interface is a collective name. During specific implementation, the communication interface may include a plurality of interfaces, for example, an interface between a first access network device and a second access network device, and/or another interface.

The storage unit 1301 may be a memory.

Figure 14:
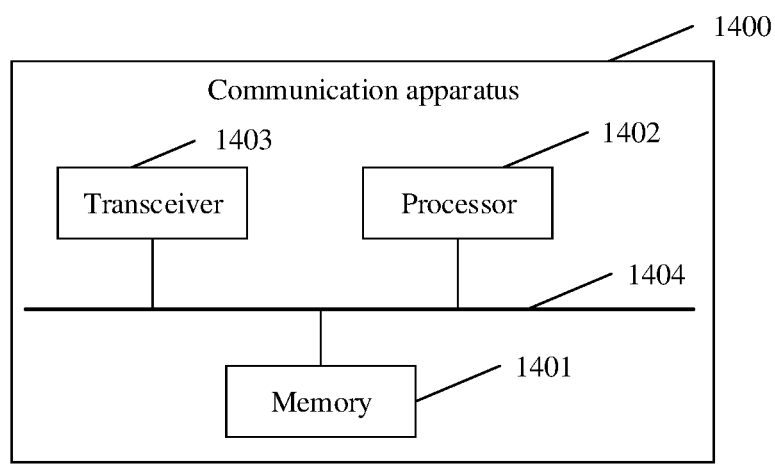
FIG. 14 is a schematic diagram of a structure of another communication apparatus according to an embodiment of the present disclosure.

When the processing unit 1302 is the processor, the communication unit 1303 is the communication interface, and the storage unit 1301 is the memory, a communication apparatus 1400 in this embodiment of the present disclosure may be shown in FIG. 14.

Refer to FIG. 14. The communication apparatus 1400 includes a processor 1402, a transceiver 1403, and a memory 1401.

The transceiver 1403 may be an independently disposed transmitter, and the transmitter may be configured to send information to another device. Alternatively, the transceiver may be an independently disposed receiver, and is configured to receive information from another device. Alternatively, the transceiver may be a component integrating functions of sending and receiving information. A specific implementation of the transceiver is not limited in the embodiments of the present disclosure.

Optionally, the communication apparatus 1400 may further include a bus 1404. The transceiver 1403, the processor 1402, and the memory 1401 may be connected to each other through the bus 1404. The bus 1404 may be a peripheral component interconnect (PCI) bus, an extended industry standard architecture (EISA) bus, or the like. The bus 1404 may be classified into an address bus, a data bus, a control bus, and the like. For ease of representation, only one thick line is used to represent the bus in FIG. 14, but this does not mean that there is only one bus or only one type of bus.

A person of ordinary skill in the art may understand that all or some of the foregoing embodiments may be implemented by software, hardware, firmware, or any combination thereof. When software is used to implement embodiments, all or some of embodiments may be implemented in a form of a computer program product. The computer program product includes one or more computer instructions. When the computer program instructions are loaded and executed on the computer, the procedure or functions according to embodiments of the present disclosure are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid state drive (SSD)), or the like.

In the several embodiments provided in the present disclosure, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network device. Some or all of the units may be selected based on actual requirements to achieve the objectives of the solutions of embodiments.

In addition, function units in embodiments of the present disclosure may be integrated into one processing unit, or each of the function units may exist alone physically, or two or more units are integrated into one unit. The integrated unit may be implemented as hardware, or may be implemented as a combination of hardware and a software functional unit.

Based on the foregoing descriptions of the implementations, a person skilled in the art may clearly understand that the present disclosure may be implemented by software in addition to necessary universal hardware or by hardware only. In most circumstances, the former is a preferred implementation. Based on such an understanding, the technical solutions in the present disclosure essentially or the part contributing to the prior art may be implemented in a form of a software product. The computer software product is stored in a readable storage medium, such as a floppy disk, a hard disk or an optical disc of a computer, and includes several instructions for instructing a computer device (which may be a personal computer, a server, a network device, or the like) to perform the methods described in embodiments of the present disclosure.

The foregoing descriptions are merely specific implementations of the present disclosure, but are not intended to limit the protection scope of the present disclosure. Any variation or replacement within the technical scope disclosed in the present disclosure shall fall within the protection scope of the present disclosure. Therefore, the protection scope of the present disclosure shall be subject to the protection scope of the claims.

What is claimed is:

1. A key management method, comprising:
   sending, by a communication apparatus, a protocol data unit (PDU) session modification request to an access and mobility management function, wherein the PDU session modification request comprises an IP address of a multicast service;
   obtaining, by the communication apparatus, a target key corresponding to the IP address of the multicast service from a control plane message, wherein the target key comprises a target multimedia broadcast/multicast service key (MSK);
   receiving, by the communication apparatus, a message from a multicast user-plane processing network element, wherein the message comprises a protected part and an unprotected part, and the protected part is obtained by encrypting a target multimedia broadcast/multicast service transport key (MTK) by using the target MSK, and the unprotected part comprises an identifier of the target MSK;
   obtaining, by the communication apparatus, the target MTK from the protected part of the message by using the target MSK corresponding to the identifier of the target MSK comprised in the unprotected part;
   receiving, by the communication apparatus, target data from the multicast user-plane processing network element, wherein the target data is data on which security protection is performed; and
   processing, by the communication apparatus, the target data by using the target MTK.

2. The key management method according to claim 1, further comprising:
   receiving, by the communication apparatus, a security algorithm from a first network element, wherein the security algorithm comprises an encryption algorithm and/or an integrity protection algorithm; and
   the processing, by the communication apparatus, the target data by using the target MTK comprises:
   processing, by the communication apparatus, the target data by using the security algorithm and the target key.

3. The key management method according to claim 2, further comprising:
   receiving, by the communication apparatus, security protection status information from the first network element, wherein the security protection status information indicates a security protection status, and the security protection comprises data encryption and/or integrity verification; and
   the processing, by the communication apparatus, the target data by using the target MTK comprises:
   when the security protection status information indicates that the security protection status is enabled, processing, by the communication apparatus, the target data by using the target MTK key.

4. The key management method according to claim 2, wherein
   the obtaining, by the communication apparatus, a target key comprises:
   receiving, by the communication apparatus, the target key from the first network element.

5. The key management method according to claim 2, further comprising:
   obtaining, by the communication apparatus, an identifier of the target key; and
   the obtaining, by the communication apparatus, a target key comprises:
   obtaining, by the communication apparatus, the target key corresponding to the identifier of the target key.

6. The key management method according to claim 5, wherein the obtaining, by the communication apparatus, an identifier of the target key comprises:
   receiving, by the communication apparatus, the identifier of the target key from the first network element; or receiving, by the communication apparatus, a key number part from the first network element; and determining, by the communication apparatus, the identifier of the target key based on the key number part and an identifier (ID) of the multicast service.

7. The key management method according to claim 1, further comprising:
receiving, by the communication apparatus, first information from a key generation network element, wherein the first information comprises at least one of: an identifier of the multicast user-plane processing network element, a first parameter, or an identifier (ID) of the multicast service, and the first parameter is determined based on a first sequence number and/or a first timestamp; and
generating, by the communication apparats, a multimedia broadcast/multicast service user key (MUK) based on the first information and a shared key, wherein the shared key is shared between the communication apparatus and a core network device; and
the obtaining, by the communication apparatus, a target key comprises:
receiving, by the communication apparatus, key information from the multicast user-plane processing network element, wherein the key information is obtained after the target key is encrypted by using the MUK; and
decrypting, by the communication apparatus, the key information by using the MUK, to obtain the target key.

8. A communication apparatus, comprising: a transceiver; at least one processor; and
one or more memories coupled to the at least one processor and storing programming instructions for execution by the at least one processor to cause the communication apparatus to:
send a protocol data unit (PDU) session modification request to an access and mobility management function, wherein the PDU session modification request comprises an IP address of a multicast service;
obtain a target key corresponding to the IP address of the multicast service from a control plane message, wherein the target key comprises a target multimedia broadcast/multicast service key (MSK);
receive a message from a multicast user-plane processing network element, wherein the message comprises a protected part and an unprotected part, and the protected part is obtained by encrypting a target multimedia broadcast/multicast service transport key (MTK) by using the target MSK and the unprotected part comprises an identifier of the target MSK;
obtain the target MTK from the protected part of the message by using the target MSK corresponding to the identifier of the target MSK comprised in the unprotected part;
receive target data from the multicast user-plane processing network element, wherein the target data is data on which security protection is performed; and
process the target data by using the target MTK.

9. The communication apparatus according to claim 8, wherein the programming instructions, when executed by the at least one processor, cause the communication apparatus to:
receive a security algorithm from a first network element, wherein the security algorithm comprises an encryption algorithm and/or an integrity protection algorithm; and
process the target data by using the security algorithm and the target MTK.

10. The communication apparatus according to claim 9, wherein the programming instructions, when executed by the at least one processor, further cause the communication apparatus to:
receive security protection status information from the first network element, wherein the security protection status information indicates a security protection status, and the security protection comprises data encryption and/or integrity verification; and
when the security protection status information indicates that the security protection status is enabled, process the target data by using the target MTK.

11. The communication apparatus according to claim 9, wherein the programming instructions, when executed by the at least one processor, further cause the communication apparatus to:
receive the target key from the first network element.

12. The communication apparatus according to claim 9, wherein the programming instructions, when executed by the at least one processor, further cause the communication apparatus to:
obtain an identifier of the target key; and
obtain the target key corresponding to the identifier of the target key.

13. The communication apparatus according to claim 12, wherein the programming instructions, when executed by the at least one processor, further cause the communication apparatus to:
receive the identifier of the target key from the first network element; or
receive a key number part from the first network element, and determine the identifier of the target key based on the key number part and an identifier (ID) of the multicast service.

14. The communication apparatus according to claim 8, wherein the programming instructions, when executed by the at least one processor, further cause the communication apparatus to:
receive first information from a key generation network element, wherein the first information comprises at least one of: an identifier of the multicast user-plane processing network element, a first parameter, or an identifier (ID) of the multicast service, and the first parameter is determined based on a first sequence number and/or a first timestamp;
generate a multimedia broadcast/multicast service user key (MUK) based on the first information and a shared key, wherein the shared key is shared between the communication apparatus and a core network device;
receive key information from the multicast user-plane processing network element, wherein the key information is obtained after the target key is encrypted by using the MUK; and
decrypt the key information by using the MUK, to obtain the target key.

15. A communication apparatus, comprising: a transceiver; at least one processor; and
one or more memories coupled to the at least one processor and storing programming instructions for execution by the at least one processor to cause the communication apparatus to:
receive a protocol data unit (PDU) session update context message from an access and mobility management function, wherein the message comprises an IP address of a multicast service, and the message corresponds to a PDU session modification request, which comprises the IP address, from a terminal device;

obtain a target key corresponding to the IP address, wherein the tar et key comprises a target multimedia broadcast/multicast service key (MSK), the target MSK is for protecting a target multimedia broadcast/multicast service transport key (MTK), and the target MTK is for protecting transmission of service data; and send the target key to the terminal device through the access and mobility management function.

16. The communication apparatus according to claim 15, wherein the programming instructions, when executed by the at least one processor, further cause the communication apparatus to:

receive the target key from a key generation network element.

17. The communication apparatus according to claim 16, wherein the programming instructions, when executed by the at least one processor, further cause the communication apparatus to:

receive a multimedia broadcast/multicast service user key (MUK) from the key generation network element;

encrypt the target key by using the MUK, to obtain key information; and send the key information to the terminal device.

18. The communication apparatus according to claim 15, wherein the programming instructions, when executed by the at least one processor, further cause the communication apparatus to:

send an identifier of the target MSK to the terminal device; or send a key number part to the terminal device, wherein a mapping relationship exists between the key number part and an identifier of the target MSK.

19. The communication apparatus according to claim 15, wherein the programming instructions, when executed by the at least one processor, further cause the communication apparatus to:

obtain a security algorithm, wherein the security algorithm comprises an encryption algorithm and/or an integrity protection algorithm; and perform security protection on multicast service data by using the security algorithm and the target MTK, to obtain target data.

20. A key management method, comprising:

receiving, by a session management function, a protocol data unit (PDU) session update context message from an access and mobility management function, wherein the message comprises an IP address of a multicast service, and the message corresponds to a PDU session modification request, which comprises the IP address, from a terminal device;

obtaining, by the session management function, a target key corresponding to the IP address, wherein the target key comprises a target multimedia broadcast/multicast service key (MSK), the target MSK is for protecting a target multimedia broadcast/multicast service transport key (MTK), and the target MTK is for protecting transmission of service data; and sending, by the session management function, the target key to the terminal device through the access and mobility management function.

* * * * *